US011514936B1

(12) United States Patent
Le et al.

(10) Patent No.: US 11,514,936 B1
(45) Date of Patent: Nov. 29, 2022

(54) READ HEAD HAVING ONE OR MORE ANTIFERROMAGNETIC LAYERS BELOW SOFT BIAS SIDE SHIELDS, AND RELATED METHODS

(71) Applicant: Western Digital Technologies, Inc., San Jose, CA (US)

(72) Inventors: Quang Le, San Jose, CA (US); Hongquan Jiang, San Jose, CA (US); Cherngye Hwang, San Jose, CA (US); Hisashi Takano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/359,199

(22) Filed: Jun. 25, 2021

(51) Int. Cl.
*G11B 5/39* (2006.01)
*G11B 5/115* (2006.01)
*G11B 5/66* (2006.01)

(52) U.S. Cl.
CPC .......... *G11B 5/3977* (2013.01); *G11B 5/3909* (2013.01); *G11B 5/3912* (2013.01); *G11B 5/3932* (2013.01); *G11B 5/115* (2013.01); *G11B 5/676* (2021.05); *G11B 2005/3996* (2013.01)

(58) Field of Classification Search
None
See application file for complete search history.

(56) References Cited

U.S. PATENT DOCUMENTS 5,436,778 A 7/1995 Lin et al.
5,530,608 A 6/1996 Aboaf et al.
5,574,605 A 11/1996 Baumgart et al.
5,656,485 A 8/1997 Jacobson et al.
5,923,505 A 7/1999 Kroes et al.
5,962,153 A 10/1999 Kirino et al.
5,963,401 A 10/1999 Dee et al.
(Continued)

FOREIGN PATENT DOCUMENTS

EP 2026337 B1 12/2010
JP H06259730 A 9/1994
(Continued)

OTHER PUBLICATIONS

Nakashio E. et al., "Flux Guide Type Tunnel-Valve Head for Tape Storage Applications", IEEE Transactions on Magnetics, vol. 38, No. 5, Sep. 2002, pp. 1925-1927.
(Continued)

*Primary Examiner* — Craig A. Renner
(74) *Attorney, Agent, or Firm* — Patterson & Sheridan, LLP; Steven H. VerSteeg

(57) ABSTRACT

The present disclosure relates to read head apparatus, and methods of forming read head apparatus, for magnetic storage devices, such as magnetic tape drives (e.g., tape drives). In one implementation, a read head for magnetic storage devices includes a lower shield, an upper shield, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes a plurality of second AFM layers disposed below the plurality of soft bias side shields along a downtrack direction.

18 Claims, 25 Drawing Sheets

400 403 443 442 420 441 SH1 401 405 411 412 413 W2 425 491 416 490 418 407 417 415 414 410 W1 452 9 442 407 420 D2 490 491 442 420 425 441 W1 D1 410 425 451 441 CT1 DT1

(56) References Cited

U.S. PATENT DOCUMENTS

| | | | | |
|---|---|---|---|---|
| 5,995,338 | A | 11/1999 | Watanabe et al. | |
| 5,998,048 | A | 12/1999 | Jin et al. | |
| 6,038,106 | A | 3/2000 | Aboaf et al. | |
| 6,185,077 | B1 | 2/2001 | Tong et al. | |
| 7,038,892 | B2 | 5/2006 | Chau et al. | |
| 7,199,975 | B1 | 4/2007 | Pan | |
| 7,986,485 | B2 | 7/2011 | Mckinstry et al. | |
| 8,576,518 | B1 * | 11/2013 | Zeltser et al. ....... | G11B 5/3932 360/324.1 |
| 9,230,576 | B1 | 1/2016 | Gill et al. | |
| 9,269,383 | B1 | 2/2016 | Hattori et al. | |
| 9,747,931 | B1 | 8/2017 | Biskebom et al. | |
| 9,947,344 | B2 | 4/2018 | Biskebom et al. | |
| 10,580,442 | B2 | 3/2020 | Biskebom et al. | |
| 2003/0179509 | A1 | 9/2003 | Pinarbasi | |
| 2005/0195535 | A1 | 9/2005 | Shi et al. | |
| 2009/0086380 | A1 | 4/2009 | Seagle | |
| 2010/0328799 | A1 | 12/2010 | Braganca et al. | |
| 2011/0007431 | A1 | 1/2011 | Braganca et al. | |
| 2011/0069413 | A1 | 3/2011 | Maat et al. | |
| 2011/0141629 | A1 | 6/2011 | Braganca et al. | |
| 2013/0286511 | A1 | 10/2013 | Edelman et al. | |
| 2014/0055884 | A1 | 2/2014 | Edelman et al. | |
| 2014/0177102 | A1 | 6/2014 | Kief et al. | |
| 2014/0218823 | A1 * | 8/2014 | McKinlay et al. .. | G11B 5/3932 360/128 |
| 2015/0199990 | A1 | 7/2015 | Braganca et al. | |
| 2015/0221329 | A1 | 8/2015 | Mashima et al. | |
| 2015/0243301 | A1 | 8/2015 | Kief et al. | |
| 2015/0325260 | A1 | 11/2015 | Singleton et al. | |
| 2017/0154641 | A1 | 6/2017 | Hao et al. | |
| 2021/0158840 | A1 | 5/2021 | Seagle et al. | |

FOREIGN PATENT DOCUMENTS

| | | | |
|---|---|---|---|
| JP | H07262525 | A | 10/1995 |
| JP | 2002289946 | A | 10/2002 |

OTHER PUBLICATIONS

Dovek, M. M. et al., “Microtrack Profiling Technique for Narrow Track Tape Heads”, IEEE Transactions on Magnetics, vol. 28, No. 5, Sep. 1992, pp. 2304-2306.

Cannon, D. M. et al., “Design and performance of a magnetic head for a high-density tape drive”, IBM J. Res. Develop., vol. 30, No. 3, May 1986, pp. 270-277.

Biskebom, Robert G. et al., “TMR tape drive for a 15 TB cartridge”, AIP Publishing, Dec. 2017, https://aip.scitation.org/doi/10.1063/1.5007788, Last accessed Jun. 22, 2021.

* cited by examiner

DT1
442
1025
1020
1060
441
510
1060
451
407
544
1025
442
441
CT1
1020
518
W1
510
513
512
407
505
443
544
452
511
H2
401
403
442
1060
441
1100
1020
1025
H1
SH1

READ HEAD HAVING ONE OR MORE ANTIFERROMAGNETIC LAYERS BELOW SOFT BIAS SIDE SHIELDS, AND RELATED METHODS

BACKGROUND OF THE DISCLOSURE

Field of the Disclosure

The present disclosure relates to read head apparatus, and methods of forming read head apparatus, for magnetic storage devices, such as magnetic tape drives (e.g., tape drives).

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

Hard bias elements adjacent sensors in tape drives can involve a high coercivity, which can hinder device performance. Soft bias elements involve a lower coercivity but is unstable and can even move during operation of the tape drive. Soft bias elements can also involve signal shunting, hindering device performance.

Therefore, there is a need in the art for tape drives having soft bias elements that facilitate low coercivity, stability of the soft bias elements, reduced signal shunting, and enhanced device performance.

SUMMARY OF THE DISCLOSURE

The present disclosure relates to read head apparatus, and methods of forming read head apparatus, for magnetic storage devices, such as magnetic tape drives (e.g., tape drives). In one implementation, a read head for magnetic storage devices includes a lower shield, an upper shield, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes a plurality of second AFM layers disposed below the plurality of soft bias side shields along a downtrack direction.

In one implementation, a read head for magnetic storage devices includes a lower shield, an upper shield, and one or more lower leads disposed between the lower shield and the upper shield. The read head includes a plurality of upper leads disposed above the one or more lower leads along a downtrack direction. Each of the plurality of upper leads and each of the one or more lower leads is nonmagnetic and conductive. The read head includes a plurality of read sensors disposed between the one or more lower leads and the plurality of upper leads. Each read sensor of the plurality of read sensors includes a multilayer structure, and the multilayer structure includes a first antiferromagnetic (AFM) layer, and a free layer. The read head includes a plurality of soft bias side shields disposed between and outwardly of the plurality of read sensors, and a plurality of second AFM layers disposed between the lower shield and the plurality of soft bias side shields.

In one implementation, a read head for magnetic storage devices includes a lower shield, an upper shield, and one or more lower leads disposed between the lower shield and the upper shield. The read head includes a plurality of upper leads disposed above the one or more lower leads along a downtrack direction. Each of the one or more lower leads and each of the plurality of upper leads is conductive. The read head includes a plurality of read sensors disposed between the one or more lower leads and the plurality of upper leads. Each read sensor of the plurality of read sensors includes a multilayer structure, and the multilayer structure includes a first antiferromagnetic (AFM) layer, and a free layer. The read head includes a plurality of soft bias side shields disposed among the plurality of read sensors, and a plurality of second AFM layers disposed between the one or more lower leads and the plurality of soft bias side shields.

In one implementation, a method of forming a read head for magnetic storage devices includes forming a lower shield, forming a lower lead layer above the lower shield, and forming a multilayer structure above the lower lead layer, the multilayer structure includes a first antiferromagnetic (AFM) layer, and a free layer. The method includes removing sections of the multilayer structure to form a plurality of read sensors, forming a plurality of first insulation layers between and outwardly of the plurality of read sensors, and forming a plurality of second AFM layers above the plurality of first insulation layers. The method includes forming a plurality of soft bias side shields above the plurality of second AFM layers, and forming one or more upper leads. The lower lead layer and each of the one or more upper leads is nonmagnetic and conductive. The method includes forming an upper shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to read head apparatus, and methods of forming read head apparatus, for magnetic storage devices, such as magnetic tape drives (e.g., tape drives). In one implementation, a read head for magnetic storage devices includes a lower shield, an upper shield, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes a plurality of second AFM layers disposed below the plurality of soft bias side shields along a downtrack direction.

Figure 1:
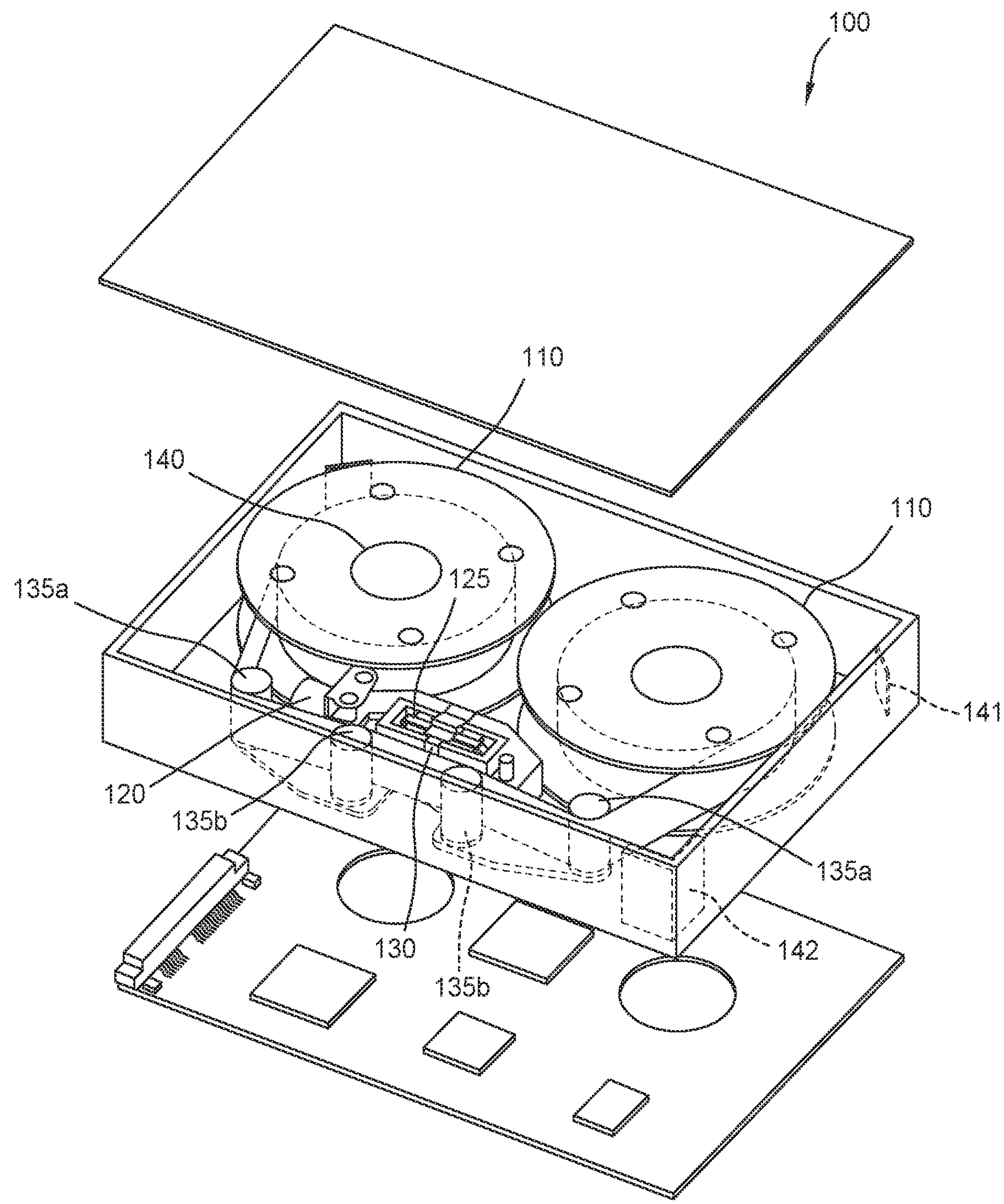
FIG. 1 is a schematic perspective exploded view of a storage device, according to one implementation.

FIG. 1 is a schematic perspective exploded view of a storage device 100, according to one implementation. The storage device 100 is a magnetic media drive, particularly a tape drive. The storage device 100 will be referred to as the tape drive 100 hereafter. It is noted that while the tape drive is shown as having embedded tape for illustrative purposes, the embodiments of the invention can be applied in various forms of tape drive including a drive where the tape media is insertable such as in a media cartridge. One example is tape drives and media conforming to the LTO standard, and the various drive illustrations shown would be similar to such a drive when the media is fully inserted and engageable for data access.

Figure 2:
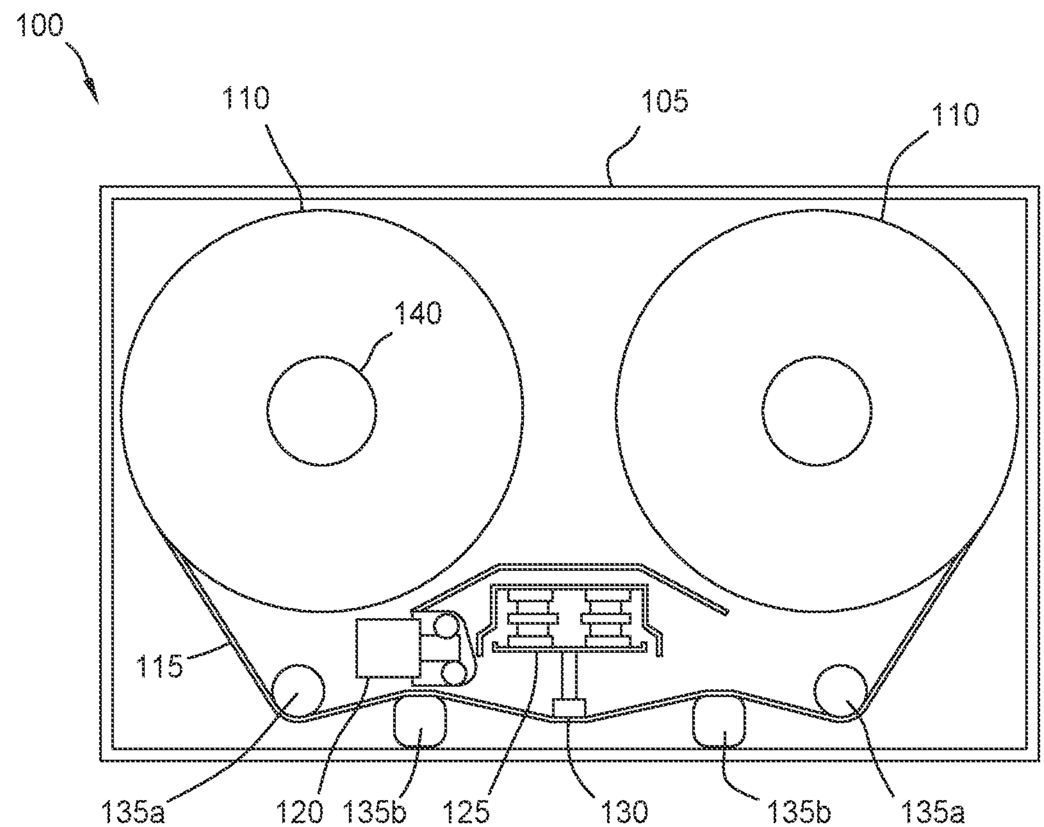
FIG. 2 is a schematic top-down view of the tape drive illustrated in FIG. 1, according to one implementation.

FIG. 2 is a schematic top-down view of the tape drive 100 illustrated in FIG. 1, according to one implementation.

Figure 3:
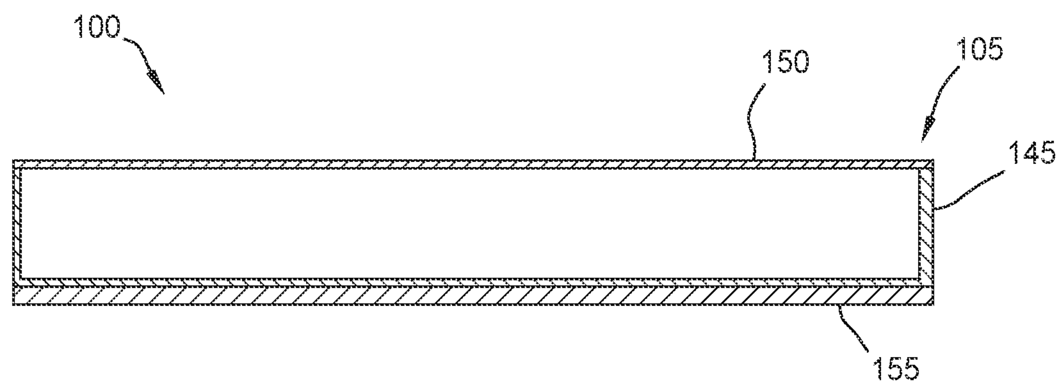
FIG. 3 is a schematic side profile view of the tape drive illustrated in FIG. 1, according to one implementation.

FIG. 3 is a schematic side profile view of the tape drive 100 illustrated in FIG. 1, according to one implementation.

Focusing on FIG. 2, for example, the tape drive 100 includes an enclosure that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135*a*, 135*b*. Focusing on FIG. 3, for example, the tape drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1.

In the illustrated implementations, two tape reels 110 are placed in the interior cavity of the casing 105, with a center of each of the two tape reels 110 on the same level in the cavity. As shown in FIGS. 1 and 2, the head assembly 130 is located between and below the two tape reels 110. Tape reel motors located in the spindles 140 of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135*a*, 135*b* (collectively referred to as guides/rollers 135) and are movably passed along the head assembly 130 by movement of the reels. The illustrated embodiment shows four guides/rollers 135*a*, 135*b*, with the two guides/rollers 135*a* furthest away from the head assembly 130 serving to change direction of the tape media 115 and the two guides/rollers 135*b* closest to the head assembly 130 by pressing the tape media 115 against the head assembly 130.

In one embodiment, which can be combined with other embodiments, the guides/rollers 135 utilize the same structure, as shown in FIG. 1. In one embodiment, which can be combined with other embodiments, the guides/rollers 135 may have more specialized shapes and differ from each other based on function, as shown in FIG. 2. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 3, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape drive 100 is sealed. Sealing can mean the tape drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape drive 100. For example, the tape drive 100 may be hermetically sealed for environmental control by attaching (e.g., laser welding, adhering using adhesive, etc.) the cover 150 to the base 145. The tape drive 100 may be filled by helium, nitrogen, hydrogen, or any other typically inert gas.

In one embodiment, which can be combined with other embodiments, other components may be added to the tape drive 100. For example, a pre-amp for the heads of the head assembly 130 may be added to the tape drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 4:
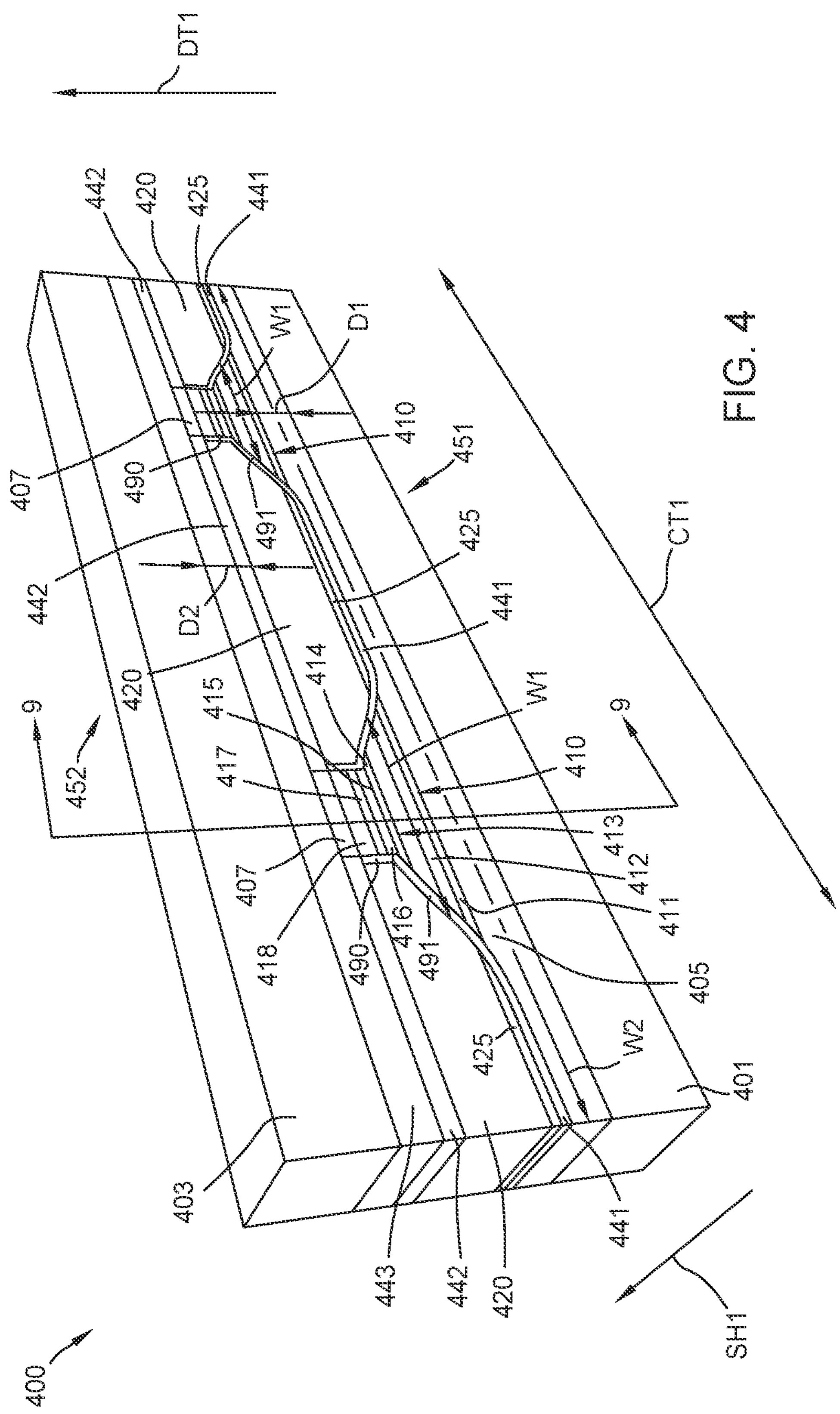
FIG. 4 is a schematic isometric media facing surface (MFS) view of a read head, according to one implementation.

FIG. 4 is a schematic isometric media facing surface (MFS) view of a read head 400, according to one implementation. The read head 400 can be used as part of the tape drive 100 (a magnetic storage device) shown in FIG. 1. The read head 400 includes a lower shield 401, an upper shield 403, and one or more lower leads 405 (one lower lead 405 is shown in FIG. 4) disposed between the lower shield 401 and the upper shield 403. The read head 400 includes a plurality of upper leads 407 disposed above the one or more lower leads 405 along a downtrack direction DT1. Each of the plurality of upper leads 407 and each of the one or more lower leads 405 is nonmagnetic and conductive.

A plurality of read sensors 410 are disposed between the one or more lower leads 405 and the plurality of upper leads 407. Each read sensor 410 of the plurality of read sensors 410 includes a multilayer structure. The multilayer structure of each read sensor 410 includes a buffer layer 411 disposed on the lower lead 405, a first antiferromagnetic (AFM) layer 412 disposed on the buffer layer 411, and a free layer 413 disposed on the first AFM layer 412. Each read sensor 410 includes a cap layer 418 disposed on the free layer 413. The buffer layer 411 is disposed between the respective first AFM layer 412 and the one or more lower leads 405. The cap layer 418 is non-ferromagnetic. The read head 400 includes a plurality of soft bias side shields 420 disposed among the plurality of read sensors 410. The plurality of soft bias side shields 420 are disposed between and outwardly of the plurality of read sensors 410. The read head 400 includes a plurality of second AFM layers 425 disposed between the lower shield 401 and the plurality of soft bias side shields 420. The second AFM layers 425 are disposed below the plurality of soft bias side shields 420 along the downtrack direction DT1. Each of the soft bias side shields 420 and the second AFM layers 425 is magnetic and conductive. The plurality of second AFM layers 425 are disposed between the plurality of soft bias side shields 420 and the one or more lower leads 405. The soft bias side shields 420 are formed of nickel-iron (NiFe).

The free layer 413 of each read sensor 410 includes a plurality of layers 414-417. The free layer 413 is ferromagnetic. The free layer 413 includes two layers 414, 416 separated by a spacer layer 415. Each of the two layers 414, 416 is formed of one or more of cobalt (Co), iron (Fe), and/or boron (B). The spacer layer 415 is formed of magnesium oxide (MgO) and is of a length along the downtrack direction DT1 that is within a range of 5 Angstroms to 200 Angstroms, such as 20 Angstroms. A layer 417 between the layer 416 and the cap layer 418 is formed of nickel-iron (NiFe).

The soft bias side shields 420 facilitate biasing the magnetic read field of the read sensors 410 during magnetic reading operations. The soft bias side shields 420 facilitate a magnetic field in a crosstrack direction CT1 during the magnetic reading operations. The second AFM layers 425 facilitates stabilizing the soft bias side shields 420 during the magnetic reading operations. The stabilization facilitated using the second AFM layers 425 facilitates preventing movement (such as movement along a stripe height direction SH1) of the soft bias side shields 420 during the magnetic reading operations.

The second AFM layers 425 are formed of iridium manganese (IrMn). The first AFM layers 412 are formed of iridium manganese (IrMn). Each of the second AFM layers 425 has a trapezoidal cross section in a plane defined by the crosstrack direction CT1 and the downtrack direction DT1. A profile of a bottom surface of each of the second AFM layers 425 is parallel to a profile of an upper surface of the first AFM layer 412 of each read sensor 410.

The buffer layer 411 of each read sensor 410 is disposed at a first distance D1 relative to the lower shield 401. The cap layer 418 of each read sensor 410 is disposed at a second distance D2 relative to the upper shield 403. The second distance D2 is substantially equal to the first distance D1. In one embodiment, which can be combined with other embodiments, the second distance D2 is substantially equal to the first distance D1 such that a difference between the second distance D2 and the first distance D1 is 1 nm or less. Depending on the configuration the difference between the second distance D2 and the first distance D1 may be different. In one embodiment which can be combined with other embodiments, a difference between the second distance D2 and the first distance D1 is 50 nm or less. The second distance D2 being substantially equal to the first distance D1 facilitates stabilizing the read sensors 410 and enhancing magnetic reading operations.

The read heads 400 includes a plurality of first insulation layers 441 disposed between and outwardly of the read sensors 410, a plurality of second insulation layers 442 disposed between and outwardly of the upper leads 407, and a third insulation layer 443 disposed between the upper leads 407 and the upper shield 403. The first insulation layers 441 are disposed between the one or more lower leads 405 and the soft bias side shields 420. The first insulation layers 441 are disposed between the plurality of second AFM layers 425 and the one or more lower leads 405, and between the first AFM layers 412 of the read sensors 410 and the plurality of soft bias side shields 420. The first insulation layers 441 are of a thickness (along the downtrack direction DT1) that is 3 nm or more.

The present disclosure contemplates that the second insulation layers 442 can be integrated into a single insulation layer, and the upper leads 407 can be disposed in recesses formed in the single insulation layer. The first AFM layer 412 of each read sensor 410 is of a first width W1 along the crosstrack direction CT1, and each lower lead 405 is of a second width W2 that is greater than the first width W1. The first width W1 of each first AFM layer 412 is taken along a lower side (lower along the downtrack direction DT1) of the respective first AFM layer 412. The upper leads 407, using the insulation layers 441, 442, 443, function as separate leads for the plurality of read sensors 410. The lower lead 405 is a common lead that spans the plurality of read sensors 410. The present disclosure contemplates that a plurality of lower leads can be used in place of the lower lead 405, such as by using a plurality of insulation layers disposed between and outwardly of the plurality of lower leads.

The read head 400 includes a first stripe side 451 and a second stripe side 452. The first stripe side 451 and the second stripe side 452 oppose each other along the stripe height direction SH1. The first stripe side 451 is a media facing surface (MFS) such as an air bearing surface (ABS).

In the implementation shown in FIG. 4, vertical sections 490 and angled sections 491 of the first insulation layers 441 contact the soft bias side shields 420.

Figure 5:
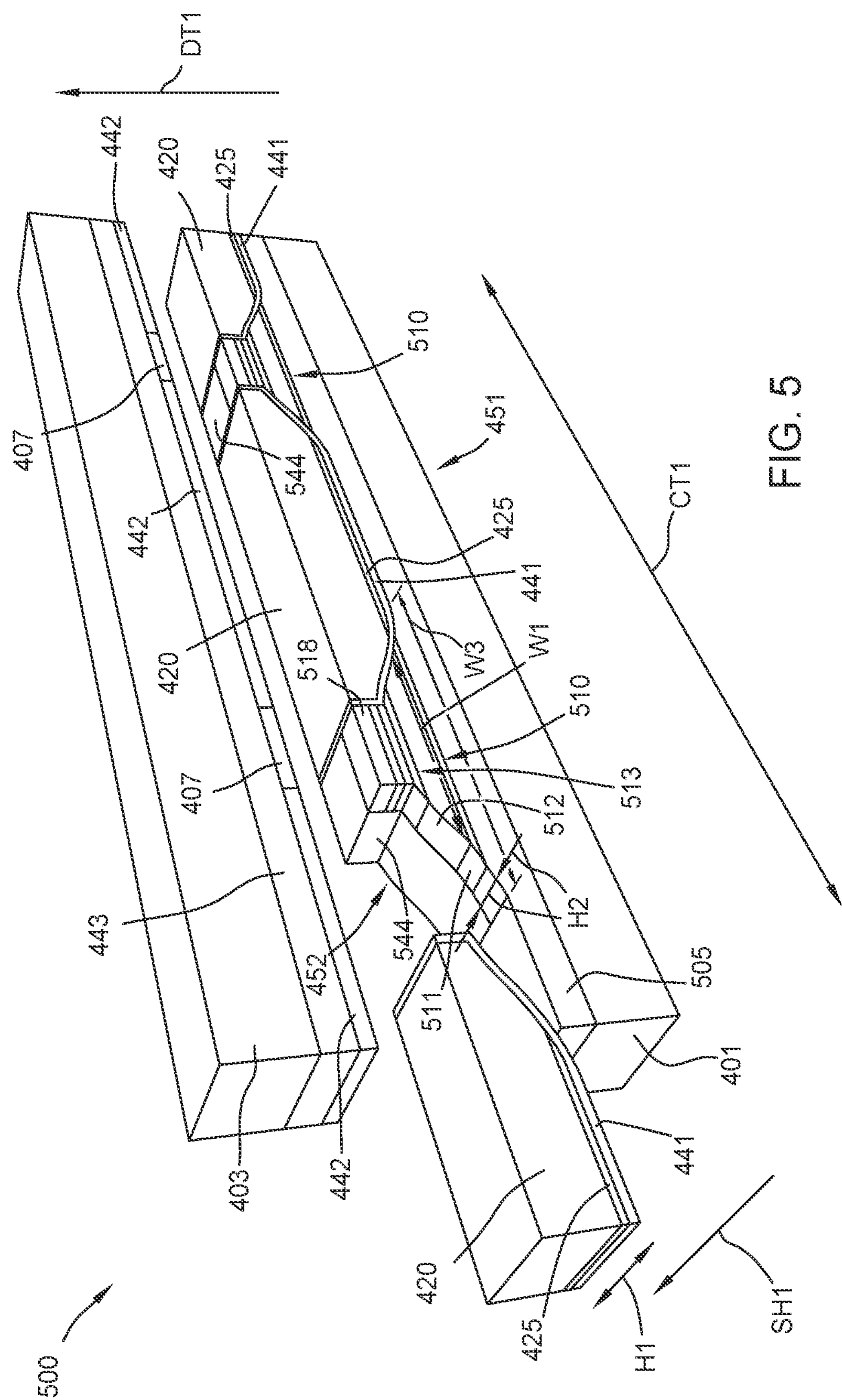
FIG. 5 is a schematic partially exploded isometric media facing surface (MFS) view of a read head, according to one implementation.

FIG. 5 is a schematic partially exploded isometric media facing surface (MFS) view of a read head 500, according to one implementation. The read head 500 is similar to the read head 400 shown in FIG. 4, and includes one or more of the aspects, features, components, and/or properties thereof.

In the implementation shown in FIG. 5, portions of each of a plurality of read sensors 510 and portions of one or more lower leads 505 on the second stripe side 452 are removed (e.g., milled), and a plurality of fourth insulation layers 544 are formed on the second stripe side 452. The read sensors 510 are similar to the read sensors 410 shown in FIG. 4, and include one or more of the aspects, features, components, and/or properties thereof. The fourth insulation layers 544 are formed behind the read sensors 510 and behind portions of the one or more lower leads 505 along the stripe height direction SH1. The fourth insulation layers 544 are disposed between the second insulation layers 442 and the lower shield 401. A lower surface of each fourth insulation layer 544 is of a width W3 (along the crosstrack direction CT1) that is greater than the first width W1 of first AFM layers 512. Each of the second AFM layers 425 is of a height H1 (along the stripe height direction SH1) that is greater than a height H2 of each of the first AFM layers 512.

Each of the fourth insulation layers 544 is formed behind (along the stripe height direction SH1) a buffer layer 511, the first AFM layer 512, the free layer 513, and a cap layer 518 of the respective read sensor 510.

Figure 6:
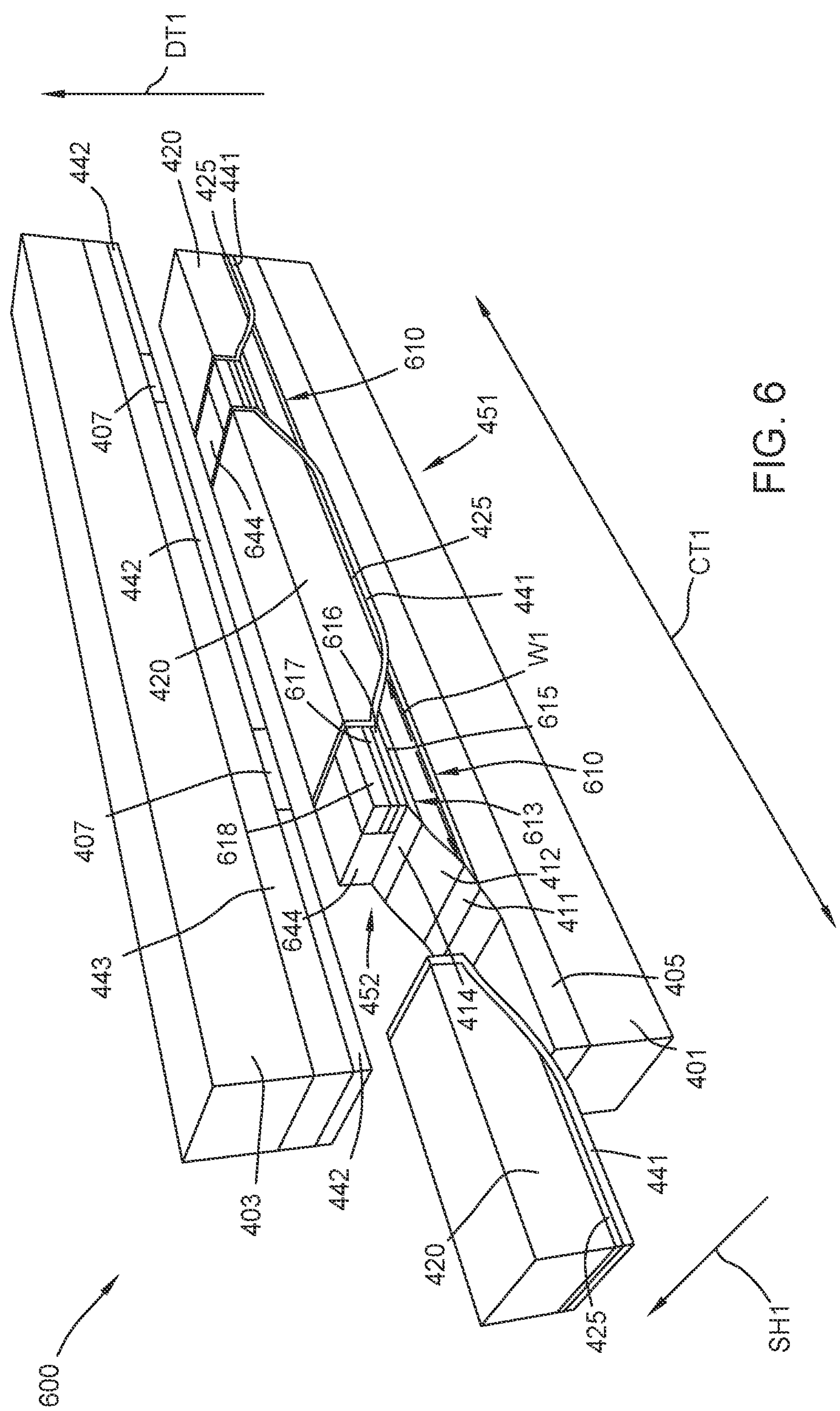
FIG. 6 is a schematic partially exploded isometric media facing surface (MFS) view of a read head, according to one implementation.

FIG. 6 is a schematic partially exploded isometric media facing surface (MFS) view of a read head 600, according to one implementation. The read head 600 is similar to the read head 400 shown in FIG. 4, and includes one or more of the aspects, features, components, and/or properties thereof.

In the implementation shown in FIG. 6, portions of each of a plurality of read sensors 610 on the second stripe side 452 are removed (e.g., milled), and a plurality of fourth insulation layers 644 are formed on the second stripe side 452. The read sensors 610 are similar to the read sensors 410 shown in FIG. 4, and include one or more of the aspects, features, components, and/or properties thereof. The fourth insulation layers 644 are formed behind portions of the read sensors 610 along the stripe height direction SH1. The fourth insulation layers 644 are disposed between the layers 414 and the upper leads 407.

Each of the fourth insulation layers 644 is formed behind (along the stripe height direction SH1) spacer layers 615 of the free layers 613, layers 616 of the free layers 613, layers 617 of the free layers 613, and a cap layer 618 of each respective read sensor 610.

Figure 7:
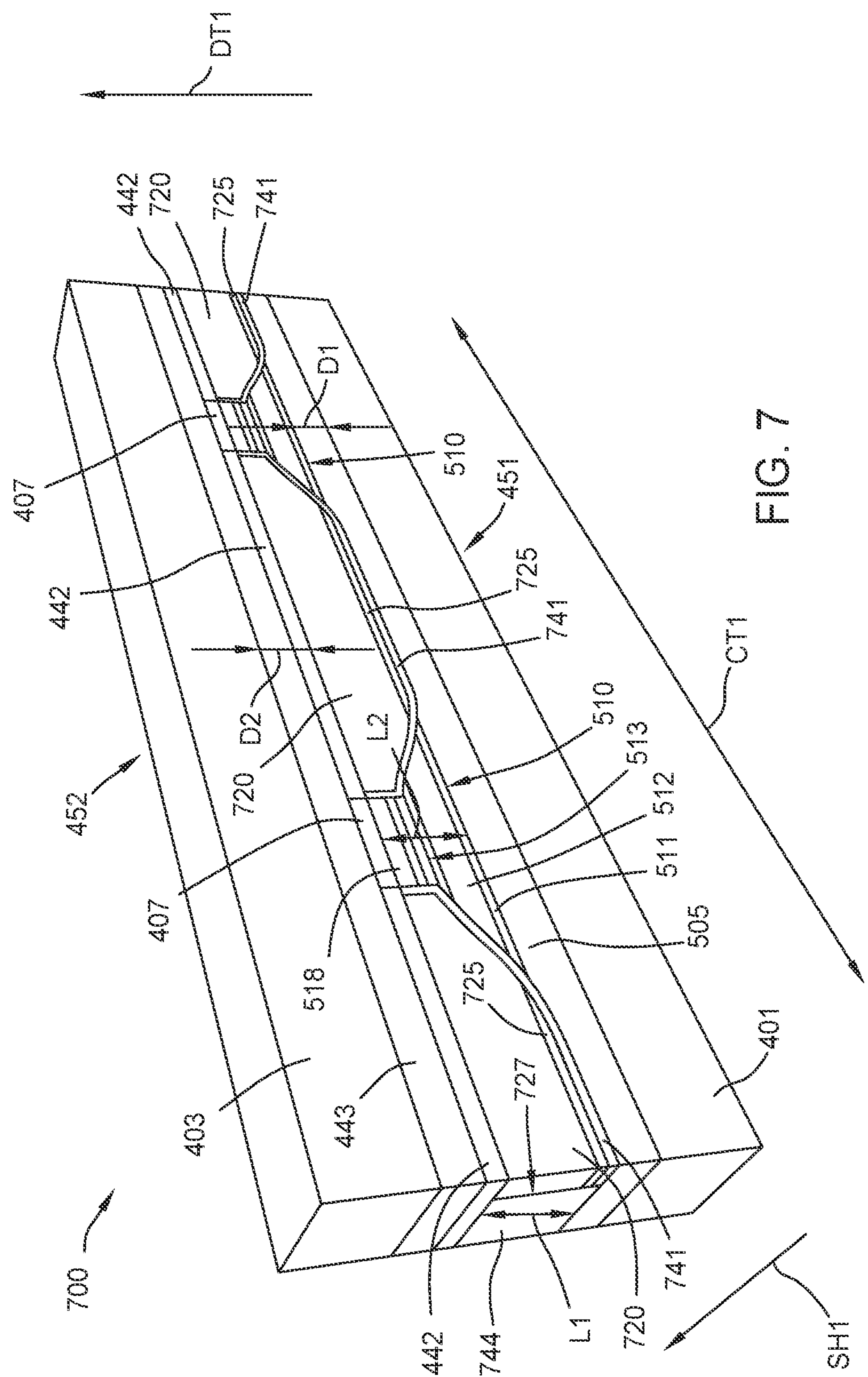
FIG. 7 is a schematic isometric media facing surface (MFS) view of a read head, according to one implementation.

FIG. 7 is a schematic isometric media facing surface (MFS) view of a read head 700, according to one implementation. The read head 700 is similar to the read head 400 shown in FIG. 4, and includes one or more of the aspects, features, components, and/or properties thereof. The read head 700 is similar to the read head 500 shown in FIG. 5, and includes one or more of the aspects, features, components, and/or properties thereof. As an example, the read head 700 combines the configurations of the read sensors 510 with the configurations of the insulation layers 442, 443.

In the implementation shown in FIG. 7, portions of the plurality of read sensors 510, portions of a plurality of soft bias side shields 720, portions of a plurality of first insulation layers 741, portions of a plurality of second AFM layers 725, and portions of the one or more lower leads 505 on the second stripe side 452 are removed (e.g., milled). A recess 727 is formed on the second stripe side 452, and a fourth insulation layer 744 is formed in the recess 727 on the second stripe side 452. The fourth insulation layer 744 is formed behind the read sensors 510 along the stripe height direction SH1.

The fourth insulation layer 744 is formed behind (along the stripe height direction SH1) the read sensors 510, the soft bias side shields 720, the first insulation layers 741, and the second AFM layers 725. The fourth insulation layer 744 includes a width along the crosstrack direction CT1 that spans the one or more lower leads 505 and the plurality of soft bias side shields 720.

The fourth insulation layer 744 is of a length L1 along the downtrack direction DT1 that is substantially equal to or greater than a length L2 of the read sensors 510. In one embodiment, which can be combined with other embodiments, the length L1 is substantially equal to the length L2 such that a difference between the length L1 and the length L2 is 1 nm or less.

Figure 8:
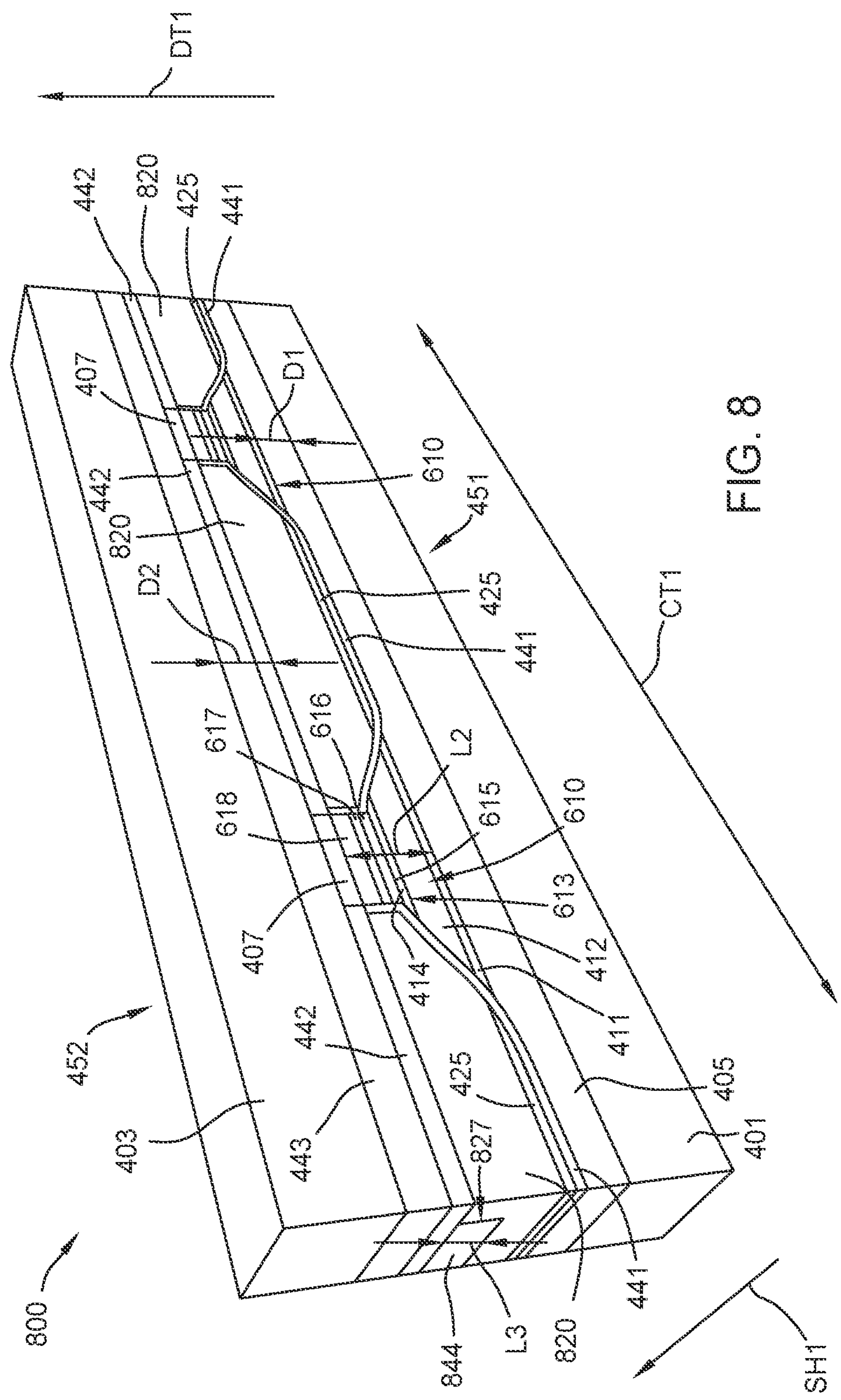
FIG. 8 is a schematic isometric media facing surface (MFS) view of a read head, according to one implementation.

FIG. 8 is a schematic isometric media facing surface (MFS) view of a read head 800, according to one implementation. The read head 800 is similar to the read head 400 shown in FIG. 4, and includes one or more of the aspects, features, components, and/or properties thereof. The read head 800 is similar to the read head 600 shown in FIG. 6, and includes one or more of the aspects, features, components, and/or properties thereof. As an example, the read head 800 combines the configurations of the read sensors 610 with the configurations of the insulation layers 441, 442, 443.

In the implementation shown in FIG. 8, portions of the spacer layers 615, portions of the layers 616, portions of the layers 617, portions of the cap layers 618, and portions of a plurality of soft bias side shields 820, are removed (e.g., milled). A recess 827 is formed on the second stripe side 452, and a fourth insulation layer 844 is formed in the recess 827 on the second stripe side 452. The fourth insulation layer 844 is formed behind the spacer layers 615, the layers 616, 617, and the cap layers 618 along the stripe height direction SH1. The fourth insulation layer 844 is formed behind (along the stripe height direction SH1) portions of the soft bias side shields 820. The fourth insulation layer 844 includes a width along the crosstrack direction CT1 that spans the one or more lower leads 405 and the plurality of soft bias side shields 820.

The fourth insulation layer 844 is of a length L3 along the downtrack direction DT1 that is lesser than the length L2 of the read sensors 610.

Figure 9:
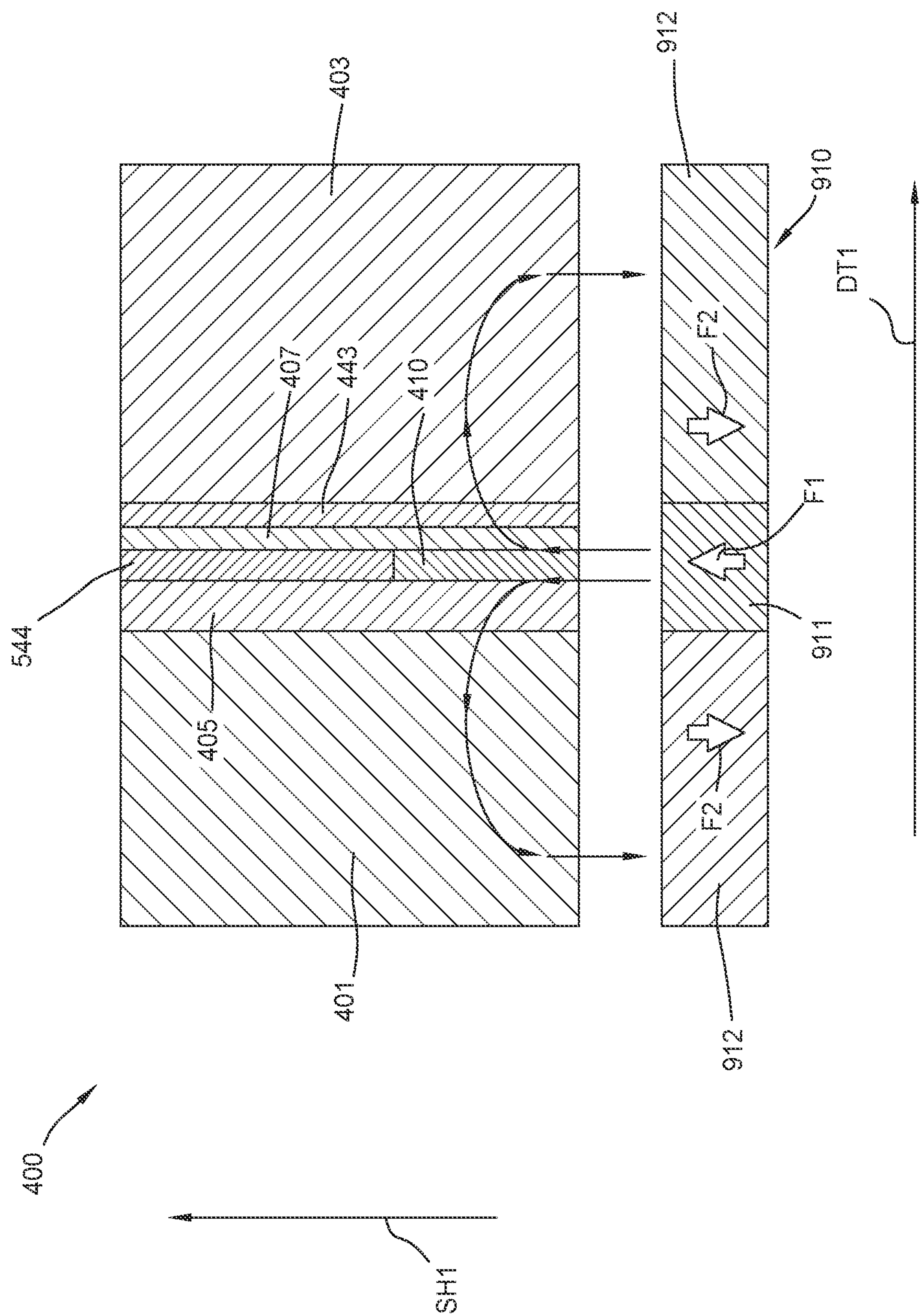
FIG. 9 is a schematic cross-sectional view, along Section 9-9, of the read head shown in FIG. 4, according to one implementation.

FIG. 9 is a schematic cross-sectional view, along Section 9-9, of the read head 400 shown in FIG. 4, according to one implementation. During magnetic reading operations, a tape media 910 moves past the read sensors 410 in the downtrack direction DT1. A portion 911 of the tape media 910 aligned with the read sensor 410 along the stripe height direction SH1 undergoes a first magnetic force F1. Portions 912 of the tape media 810 aligned outside of the read sensor 410 along the stripe height direction SH1 undergoes second magnetic forces F2 that have the opposite or the same direction as the first magnetic force F1.

Figure 10:
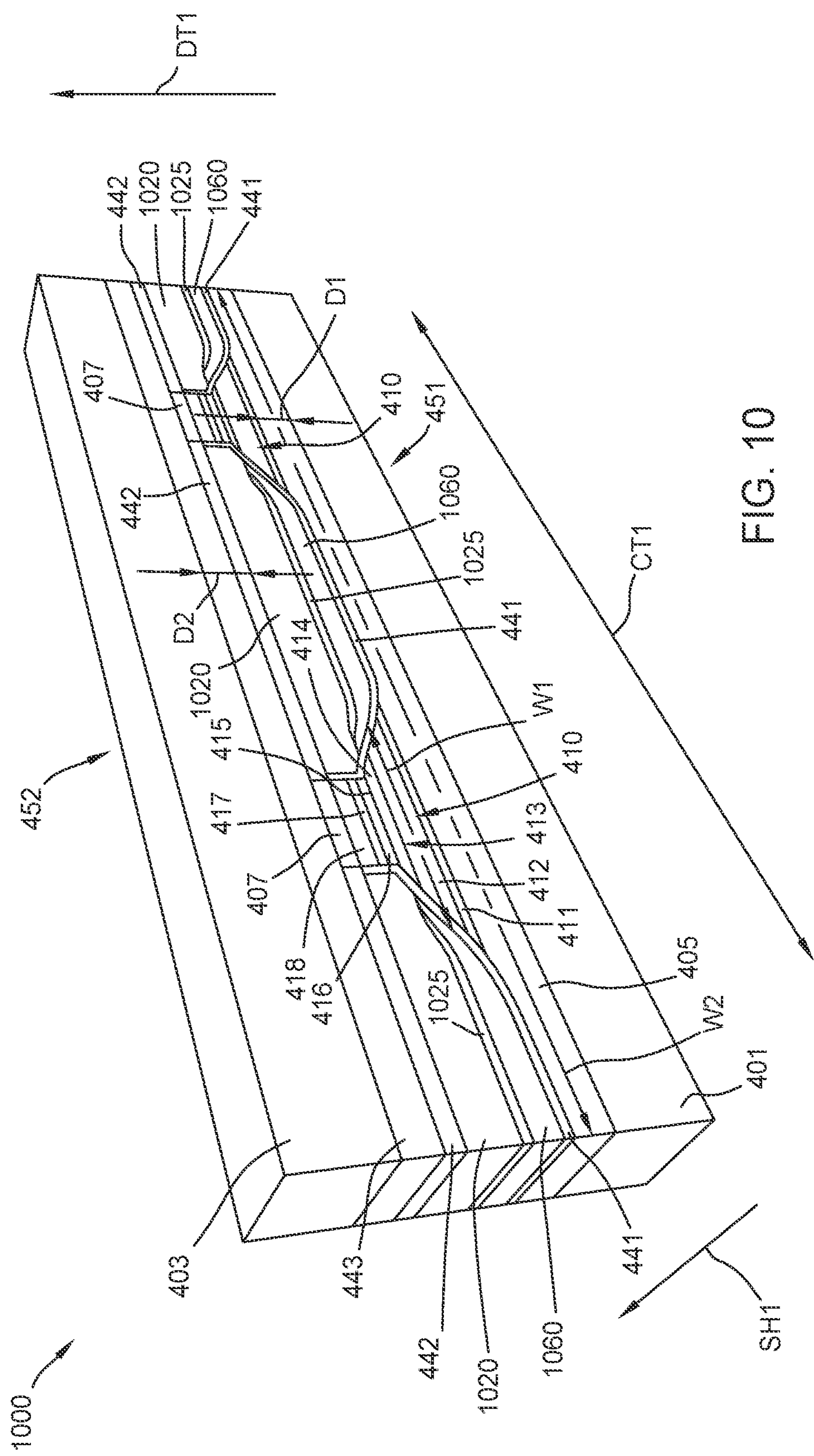
FIG. 10 is a schematic isometric media facing surface (MFS) view of a read head, according to one implementation.

FIG. 10 is a schematic isometric media facing surface (MFS) view of a read head 1000, according to one implementation. The read head 1000 is similar to the read head 400 shown in FIG. 4, and includes one or more of the aspects, features, components, and/or properties thereof.

The read head 1000 includes a plurality of soft bias side shields 1020 disposed between and outwardly of the read sensors 410. A plurality of buffer layers 1060 are disposed on the first insulation layers 441. A second plurality of AFM layers 1025 are formed on the buffer layers 1060 and disposed between the buffer layers 1060 and the soft bias side shields 1020. Each of the buffer layers 411, 1060 are nonmagnetic. The buffer layers 1060 are disposed between the plurality of second AFM layers 1025 and the first insulation layers 441, and the plurality of first insulation layers 441 are disposed between the plurality of buffer layers 1060 and the one or more lower leads 405. The first insulation layers 441 are disposed between the first AFM layers 412 of the read sensors 410 and the plurality of buffer layers 1060. Each buffer layer 411 and each buffer layer 1060 is nonmagnetic and is formed of one or more of nickel-chromium (NiCr), ruthenium (Ru), and/or tantalum (Ta).

The plurality of buffer layers 1060 facilitate raising the second AFM layers 1025 in the implementation of FIG. 10 above (along the downtrack direction DT1) the second AFM layers 425 in the implementation of FIG. 4.

Figure 11:
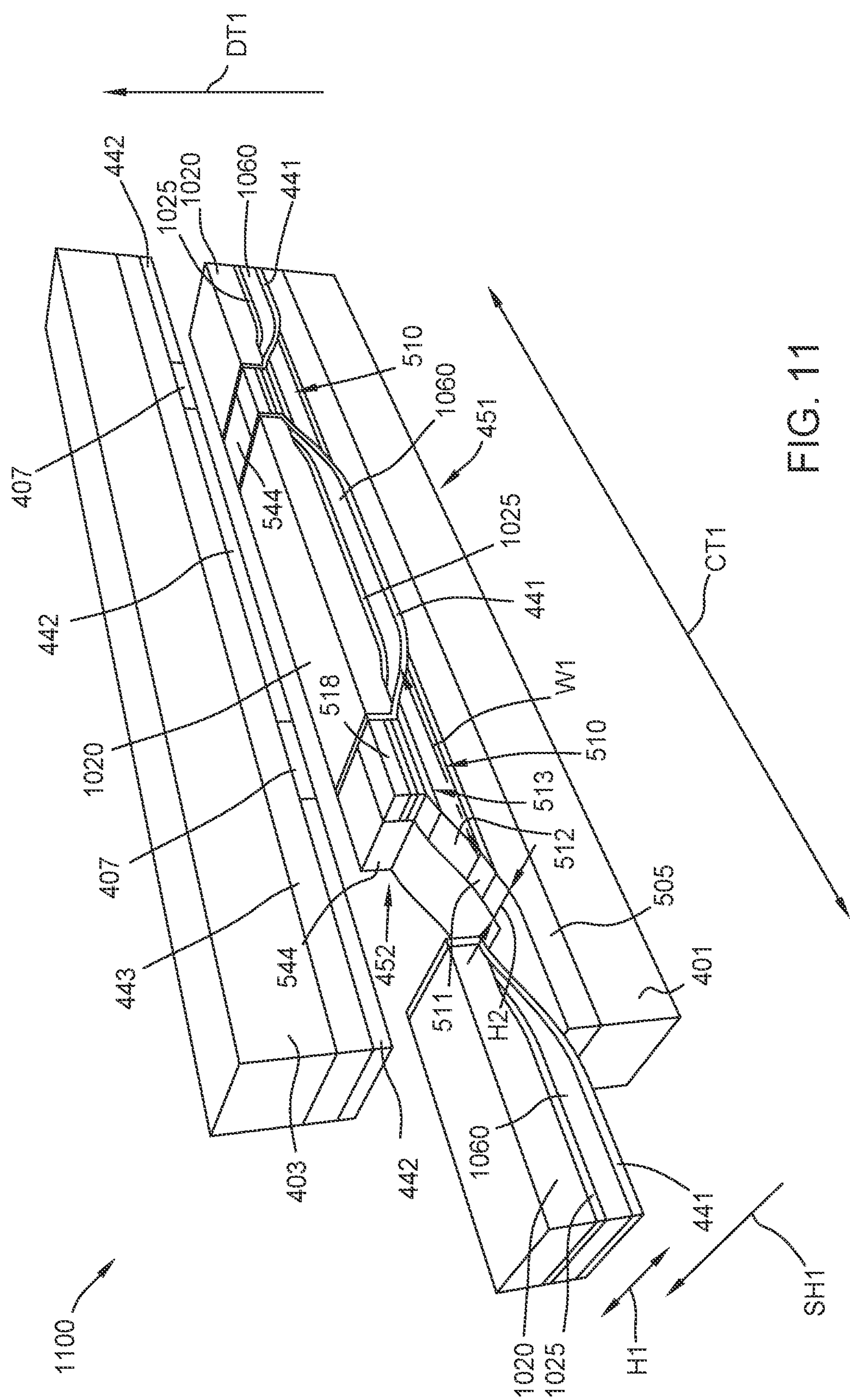
FIG. 11 is a schematic partially exploded isometric media facing surface (MFS) view of a read head, according to one implementation.

FIG. 11 is a schematic partially exploded isometric media facing surface (MFS) view of a read head 1100, according to one implementation. The read head 1100 is similar to the read head 500 shown in FIG. 5, and includes one or more of the aspects, features, components, and/or properties thereof. The read head 1100 is similar to the read head 1000 shown in FIG. 10, and includes one or more of the aspects, features, components, and/or properties thereof. As an example, the read head 1100 combines the configurations of the read sensors 510 with the configurations of the soft bias side shields 1020 and the buffer layers 1060.

Each of the second AFM layers 1025 is of the height H1 (along the stripe height direction SH1) that is greater than the height H2 of each of the first AFM layers 512.

Figure 12:
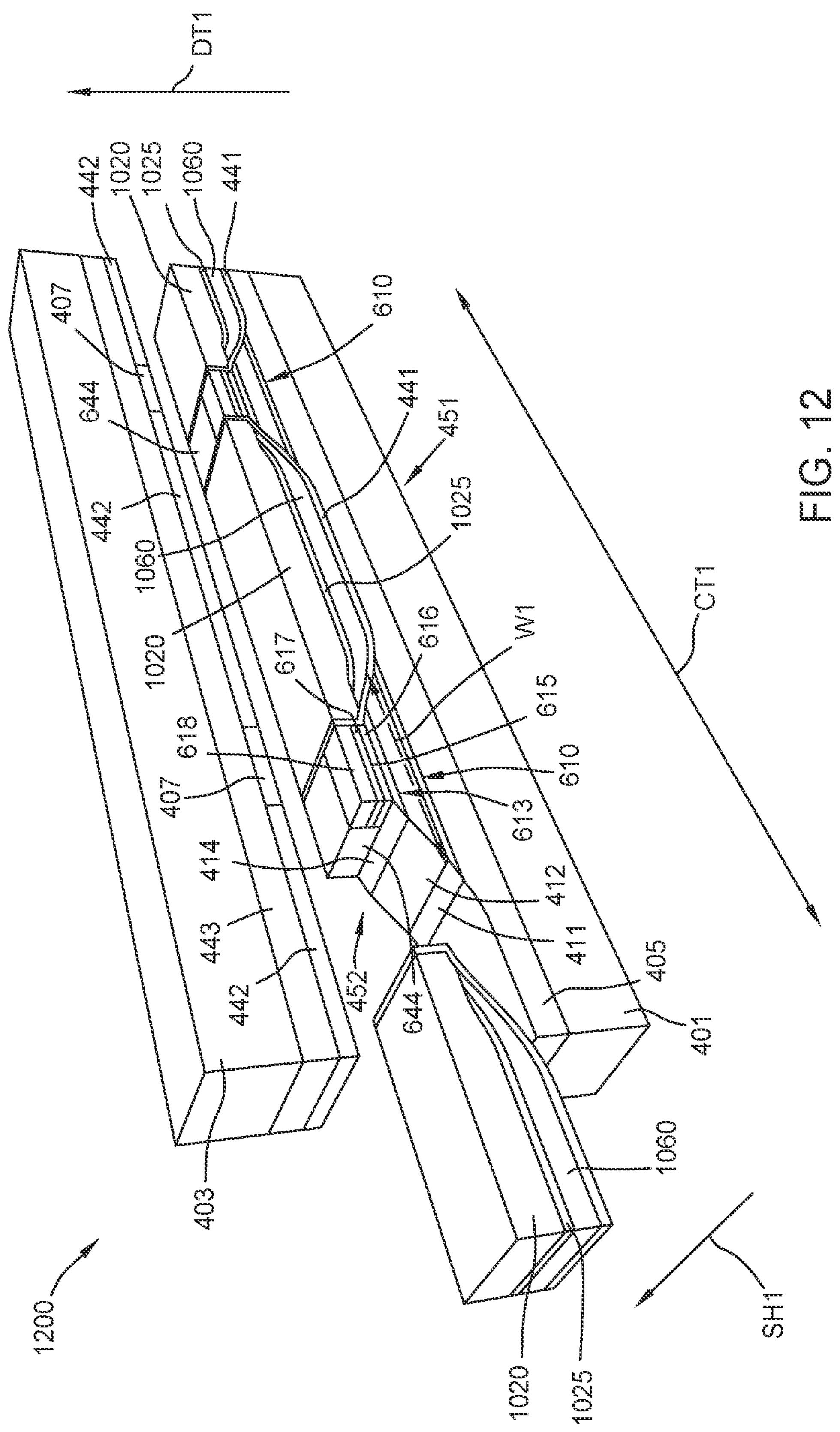
FIG. 12 is a schematic partially exploded isometric media facing surface (MFS) view of a read head, according to one implementation.

FIG. 12 is a schematic partially exploded isometric media facing surface (MFS) view of a read head 1200, according to one implementation. The read head 1200 is similar to the read head 600 shown in FIG. 6, and includes one or more of the aspects, features, components, and/or properties thereof. The read head 1200 is similar to the read head 1000 shown in FIG. 10, and includes one or more of the aspects, features, components, and/or properties thereof. As an example, the read head 1200 combines the configurations of the read sensors 610 with the configurations of the soft bias side shields 1020 and the buffer layers 1060.

Figure 13:
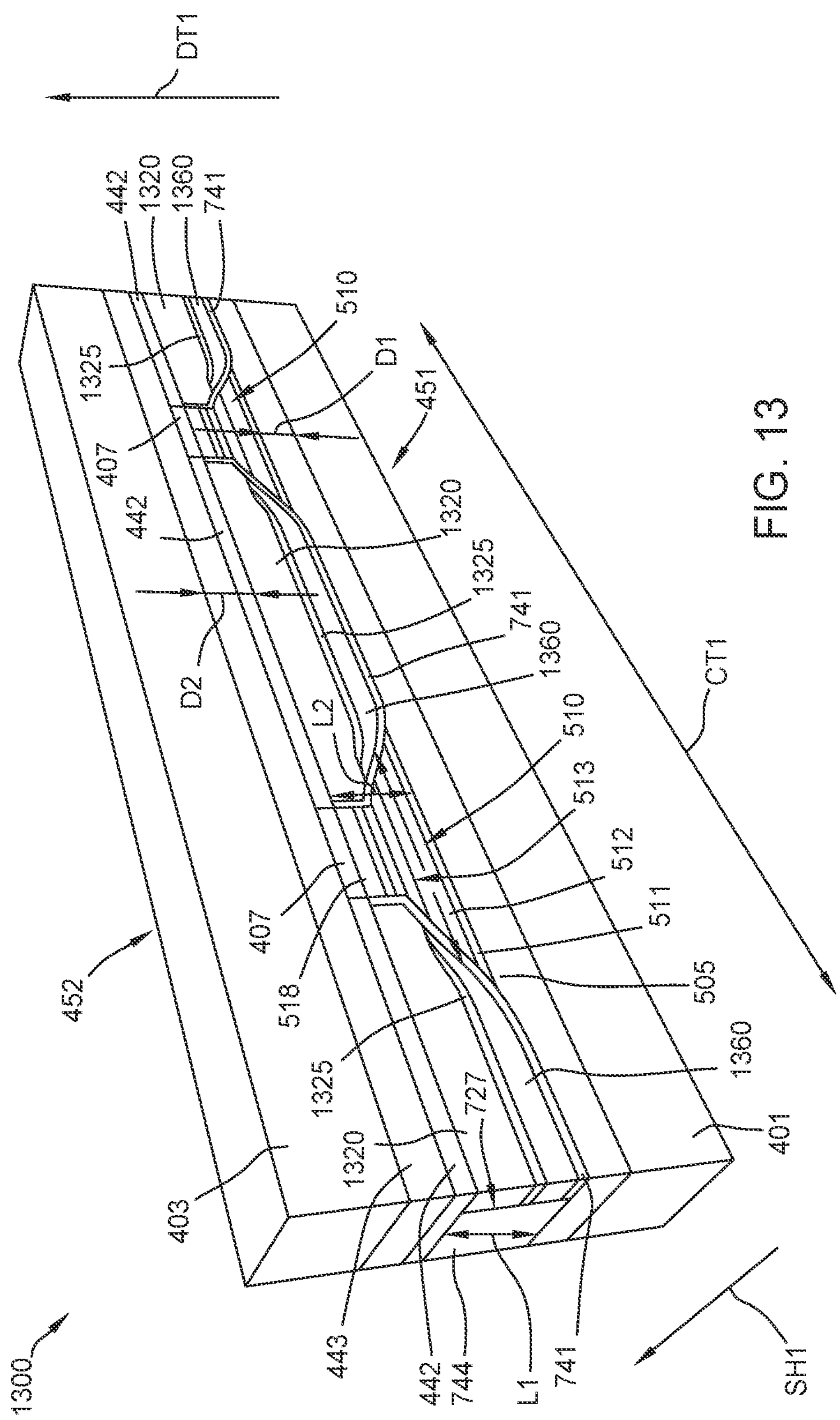
FIG. 13 is a schematic isometric media facing surface (MFS) view of a read head, according to one implementation.

FIG. 13 is a schematic isometric media facing surface (MFS) view of a read head 1300, according to one implementation. The read head 1300 is similar to the read head 700 shown in FIG. 7, and includes one or more of the aspects, features, components, and/or properties thereof. The read head 1300 is similar to the read head 1000 shown in FIG. 10, and includes one or more of the aspects, features, components, and/or properties thereof. As an example, the read head 1300 combines the configurations of the insulation layers 442, 443 with the configurations of the insulation layers 741.

The fourth insulation layer 744 is formed behind (along the stripe height direction SH1) the read sensors 510, a plurality of soft bias side shields 1320, the plurality of first insulation layers 741, a second AFM layers 1325, and a plurality of buffer layers 1360. The buffer layers 1060, 1360 are nonmagnetic.

Figure 14:
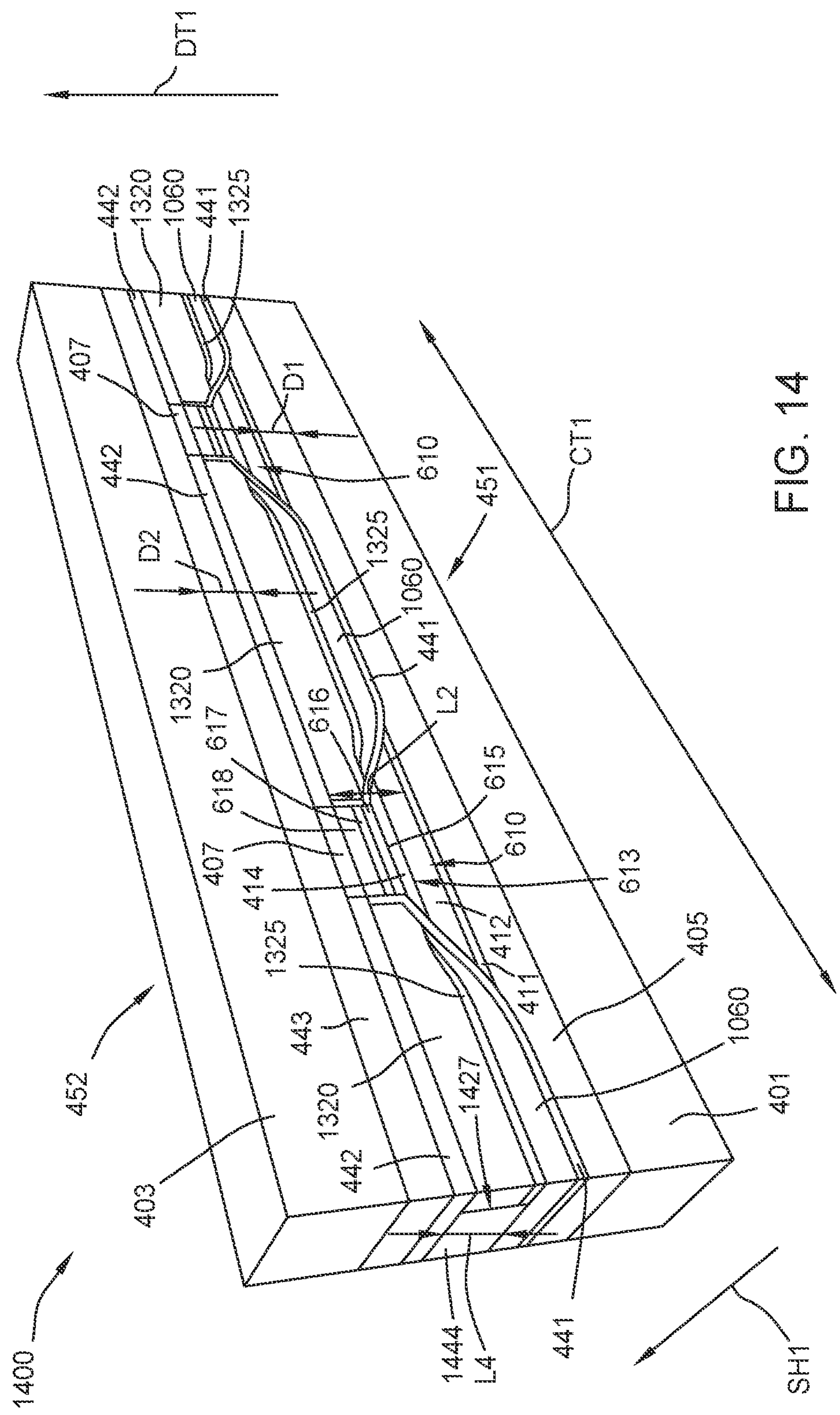
FIG. 14 is a schematic isometric media facing surface (MFS) view of a read head, according to one implementation.

FIG. 14 is a schematic isometric media facing surface (MFS) view of a read head 1400, according to one implementation. The read head 1400 is similar to the read head 800 shown in FIG. 8, and includes one or more of the aspects, features, components, and/or properties thereof. The read head 1400 is similar to the read head 1000 shown in FIG. 10, and includes one or more of the aspects, features, components, and/or properties thereof. The read head 1400 is similar to the read head 1300 shown in FIG. 13, and includes one or more of the aspects, features, components, and/or properties thereof. As an example, the read head 1400 combines the configurations of the buffer layers 1060 with the configurations of the soft bias side shields 1320 and the second AFM layers 1325.

The read head 1400 includes a fourth insulation layer 1444. The fourth insulation layer 1444 is similar to the fourth insulation layer 844 shown in FIG. 8, and includes one or more of the aspects, features, components, and/or properties thereof. The fourth insulation layer 1444 is formed behind the spacer layers 615, the layers 616, 617, the cap layers 618, the second AFM layers 1325, and the soft bias side shields 1320 along the stripe height direction SH1. A recess 1427 is formed on the second stripe side 452, and the fourth insulation layer 1444 is formed in the recess 1427 on the second stripe side 452.

The fourth insulation layer 1444 is of a length L4 along the downtrack direction DT1 that is lesser than the length L2 of the read sensors 610.

Figure 15:
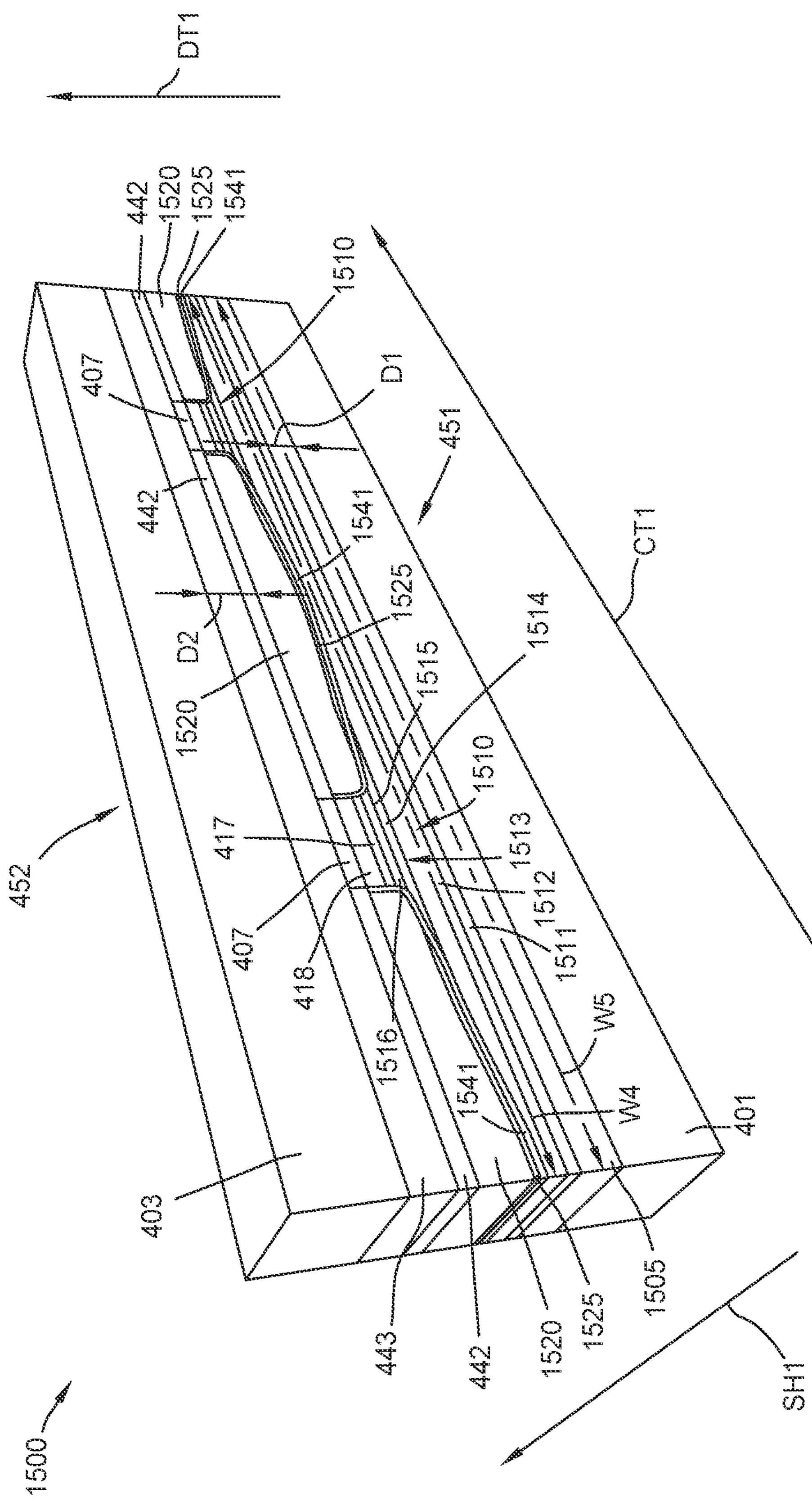
FIG. 15 is a schematic isometric media facing surface (MFS) view of a read head, according to one implementation.

FIG. 15 is a schematic isometric media facing surface (MFS) view of a read head 1500, according to one implementation. The read head 1500 is similar to the read head 400 shown in FIG. 4, and includes one or more of the aspects, features, components, and/or properties thereof. The read head 1500 includes a plurality of read sensors 1510. A first AFM layer of each read sensor 1510 is a part of a common AFM layer 1512 spanning the plurality of read sensors 1510. A buffer layer of each read sensor 1510 is a part of a common buffer layer 1511 spanning the plurality of read sensors 1510. In the implementation shown in FIG. 4, more of the buffer layers 411, the first AFM layers 412, and the free layers 413 are milled along the crosstrack direction CT1 than the common buffer layer 1511, the common AFM layer 1512, and the free layers 1513 of the implementation shown in FIG. 15.

The read head 1500 includes a common lower lead 1505 spanning the plurality of read sensors 1510, and a plurality of first insulation layers 1541 are disposed between a plurality of second AFM layers 1525 and the common lower lead 1505. The second AFM layers 1525 are disposed between the first insulation layers 1541. The read head 1500 includes a plurality of soft bias side shields 1520. A free layer 1513 of each read sensor 1510 includes two layers 1514, 1516 separated by a spacer layer 1515.

The common AFM layer 1512 is of a first width W4 along the crosstrack direction CT1, and the common lower lead 1505 is of a second width W5 that is substantially equal to the first width W4. In one embodiment, which can be combined with other embodiments, the first width W4 is substantially equal to the second width W5 such that a difference between the first width W4 and the second width W5 is 1 nm or less.

Figure 16:
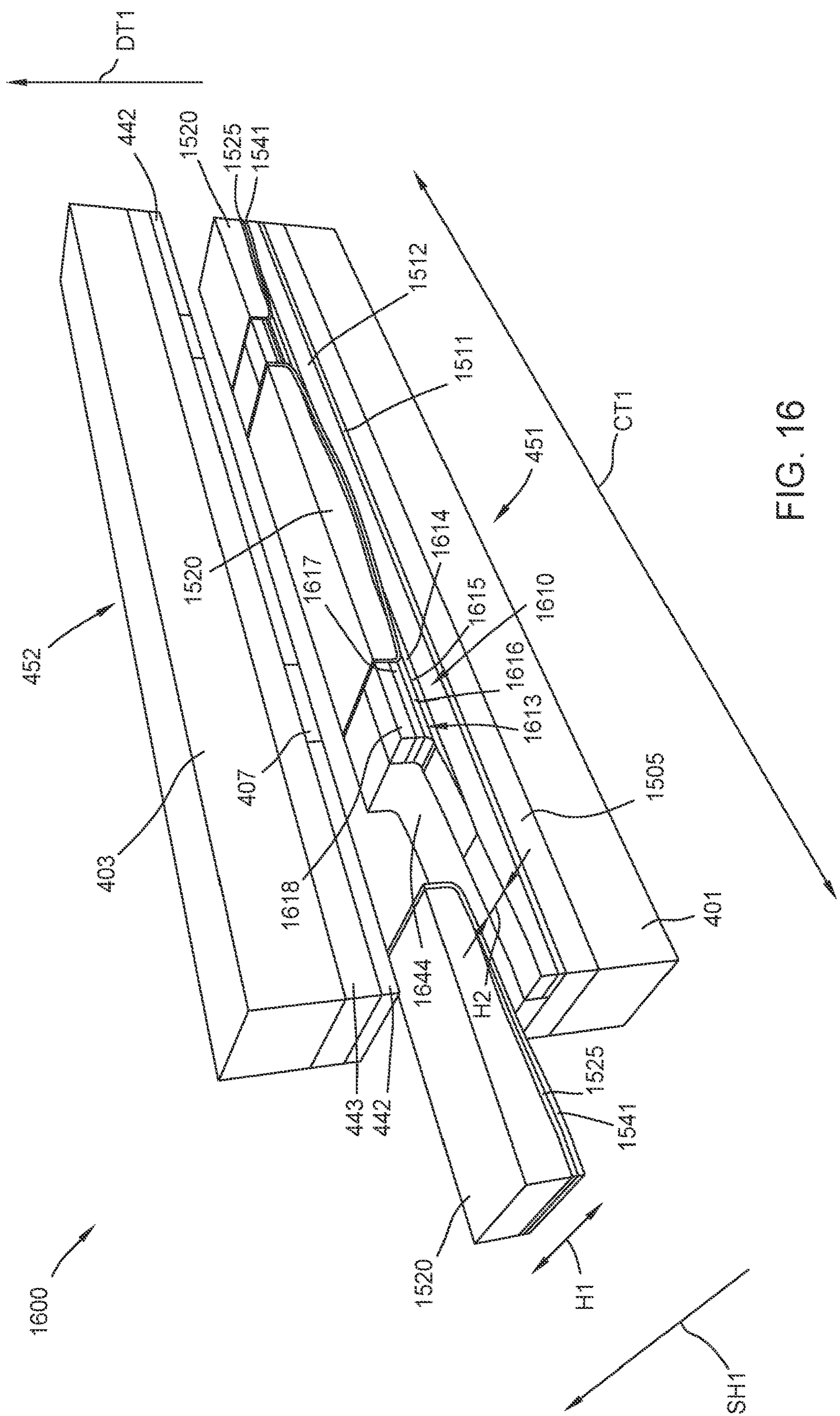
FIG. 16 is a schematic partially exploded isometric media facing surface (MFS) view of a read head, according to one implementation.

FIG. 16 is a schematic partially exploded isometric media facing surface (MFS) view of a read head 1600, according to one implementation. The read head 1600 is similar to the read head 1500 shown in FIG. 15, and includes one or more of the aspects, features, components, and/or properties thereof.

In the implementation shown in FIG. 16, portions of each of a plurality of read sensors 1610 (including the common AFM layer 1512 and the common buffer layer 1511) on the second stripe side 452 are removed (e.g., milled), and one or more fourth insulation layers 1644 (one is shown in FIG. 16) are formed on the second stripe side 452. The read sensors 1610 are similar to the read sensors 410 shown in FIG. 4, and include one or more of the aspects, features, components, and/or properties thereof. The one or more fourth insulation layers 1644 are formed behind the read sensors 1610 along the stripe height direction SH1. In the implementation shown in FIG. 16, a single fourth insulation layer 1644 spans the common AFM layer 1512.

Each of the second AFM layers 1525 is of a height H1 (along the stripe height direction SH1) that is greater than the height H2 the common AFM layer 1512. Each of the fourth insulation layers 544 is formed behind (along the stripe height direction SH1) a buffer layer 511, the first AFM layer 512, the free layer 513, and a cap layer 518 of the respective read sensor 510. A free layer 1613 of each read sensor 1610 is similar to the free layers 1513 shown in FIG. 15, and includes one or more of the aspects, features, components, and/or properties thereof.

A free layer 1613 of each read sensor 1610 includes two layers 1614, 1616 separated by a spacer layer 1615. Each read sensor 1610 includes a layer 1617 and a cap layer 1618.

Figure 17:
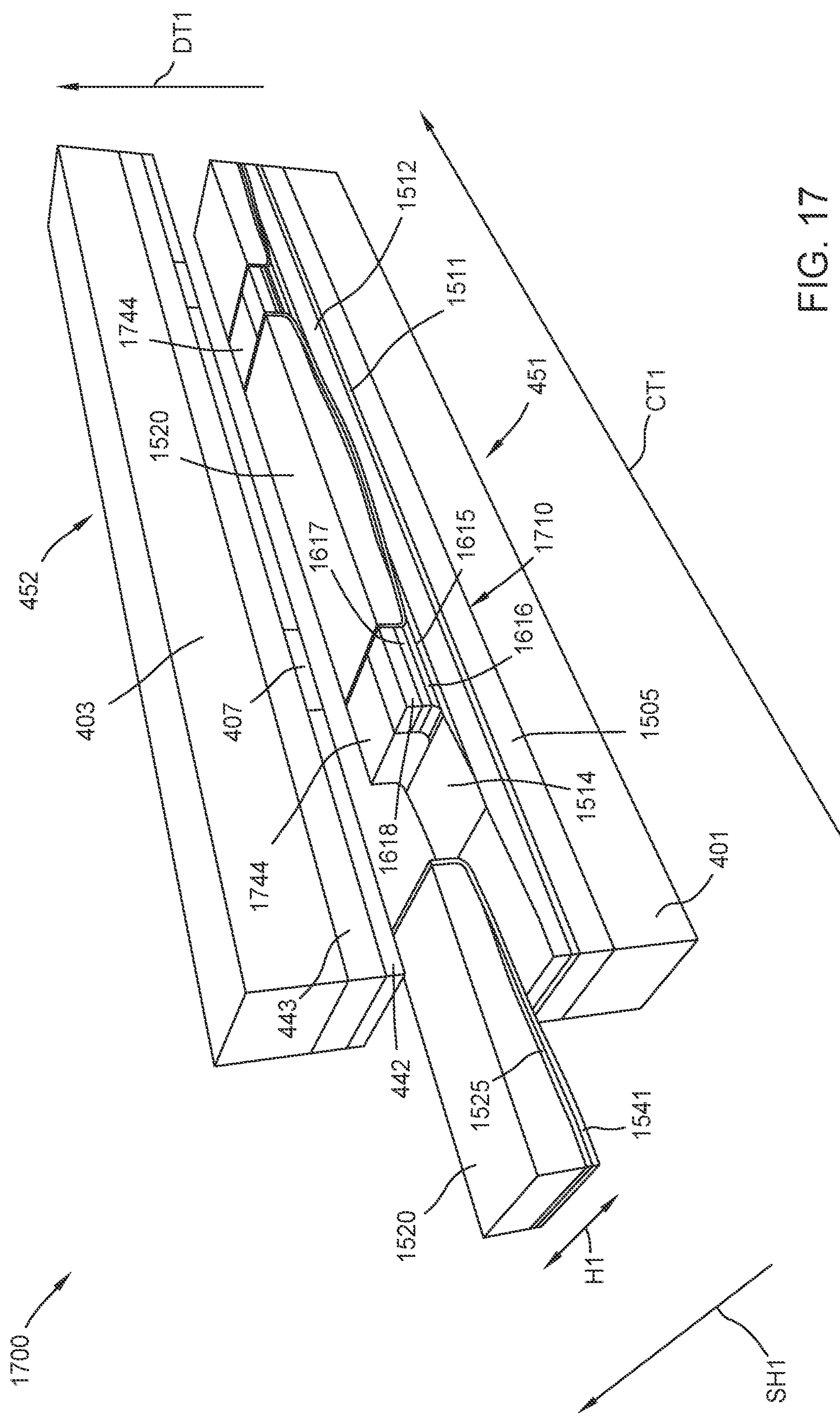
FIG. 17 is a schematic partially exploded isometric media facing surface (MFS) view of a read head, according to one implementation.

FIG. 17 is a schematic partially exploded isometric media facing surface (MFS) view of a read head 1700, according to one implementation. The read head 1700 is similar to the read head 1500 shown in FIG. 15, and includes one or more of the aspects, features, components, and/or properties thereof. The read head 1700 is similar to the read head 1600 shown in FIG. 16, and includes one or more of the aspects, features, components, and/or properties thereof.

As an example, the read head 1700 combines the configurations of the common AFM layer 1512 and the layer 1514 with the configurations of the spacer layer 1615, the layers 1616, 1617, and the cap layer 1618.

In the implementation shown in FIG. 17, portions of each of a plurality of read sensors 1710 on the second stripe side 452 are removed (e.g., milled), and a plurality of fourth insulation layers 1744 are formed on the second stripe side 452. The read sensors 1710 are similar to the read sensors 410 shown in FIG. 4, and include one or more of the aspects, features, components, and/or properties thereof.

Each of the fourth insulation layers 1744 is formed behind (along the stripe height direction SH1) the spacer layers 1615 of the free layers 1613, the layers 1616 of the free layers 1613, layers 1617 of the free layers 1613, and the cap layer 1618 of each respective read sensor 1610.

Figure 18:
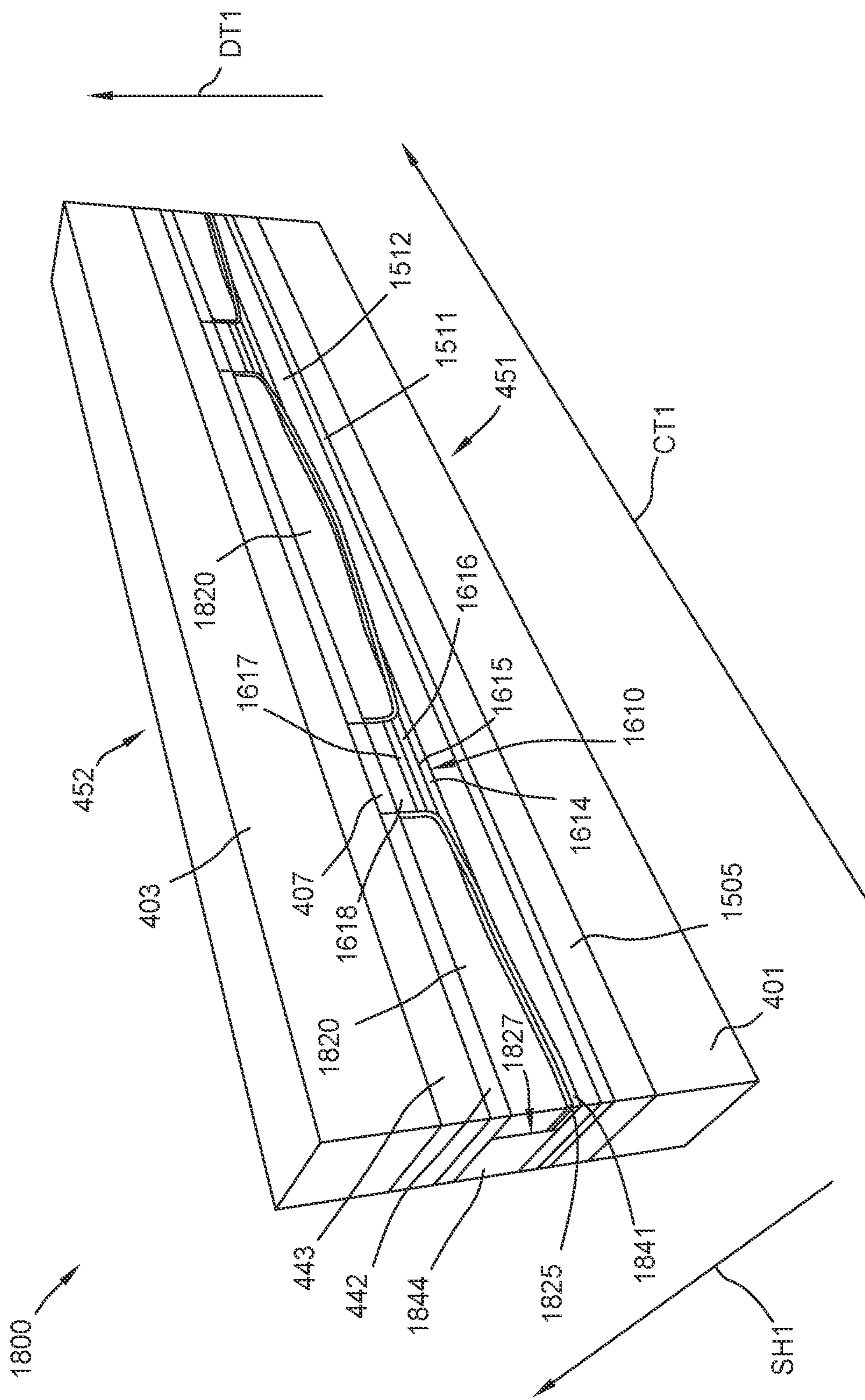
FIG. 18 is a schematic isometric media facing surface (MFS) view of a read head, according to one implementation.

FIG. 18 is a schematic isometric media facing surface (MFS) view of a read head 1800, according to one implementation. The read head 1800 is similar to the read head 1500 shown in FIG. 15, and includes one or more of the aspects, features, components, and/or properties thereof. The read head 1800 is similar to the read head 1600 shown in FIG. 16, and includes one or more of the aspects, features, components, and/or properties thereof. As an example, the read head 1800 combines the configurations of the common buffer layer 1511 and the common AFM layer 1512 with the configurations of the read sensors 1610.

In the implementation shown in FIG. 18, portions of the plurality of read sensors 1610, portions of a plurality of soft bias side shields 1820, portions of a plurality of first insulation layers 1841, and portions of a plurality of second AFM layers 1825 are removed (e.g., milled). A recess 1827 is formed on the second stripe side 452, and a fourth insulation layer 1844 is formed in the recess 1827 on the second stripe side 452. The fourth insulation layer 1844 is formed behind the read sensors 1610 along the stripe height direction SH1. The fourth insulation layer 1844 is similar to the fourth insulation layer 744 shown in FIG. 7, and includes one or more of the aspects, features, components, and/or properties thereof.

The fourth insulation layer 1844 is formed behind (along the stripe height direction SH1) the soft bias side shields 1820, the first insulation layers 1841, and the second AFM layers 1825.

Figure 19:
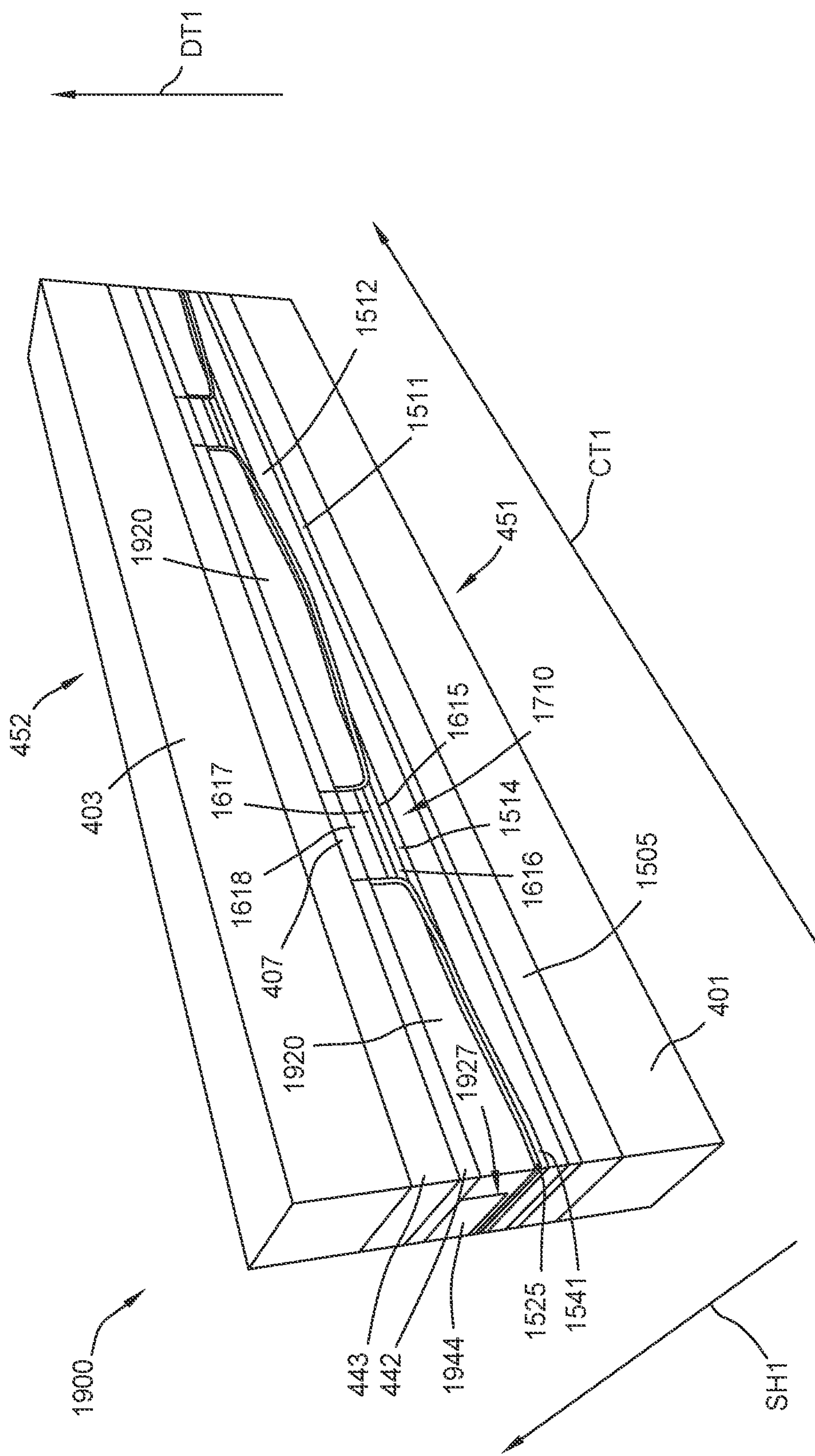
FIG. 19 is a schematic isometric media facing surface (MFS) view of a read head, according to one implementation.

FIG. 19 is a schematic isometric media facing surface (MFS) view of a read head 1900, according to one implementation. The read head 1900 is similar to the read head 1500 shown in FIG. 15, and includes one or more of the aspects, features, components, and/or properties thereof. The read head 800 is similar to the read head 1700 shown in FIG. 17, and includes one or more of the aspects, features, components, and/or properties thereof. As an example, the read head 1900 combines the configurations of the common buffer layer 1511 and the common AFM layer 1512 with the configurations of the read sensors 1710.

In the implementation shown in FIG. 19, portions of a plurality of soft bias side shields 1920, are removed (e.g., milled). A recess 1927 is formed on the second stripe side 452, and a fourth insulation layer 1944 is formed in the recess 1927 on the second stripe side 452. The fourth insulation layer 1944 is formed behind the spacer layers 1615, the layers 1616, 1617, and the cap layers 1618 along the stripe height direction SH1. The fourth insulation layer 1944 is formed behind (along the stripe height direction SH1) portions of the soft bias side shields 1920. The fourth insulation layer 1944 includes a width along the crosstrack direction CT1 that spans the common lower lead 1505 and the plurality of soft bias side shields 1920.

The fourth insulation layer 1944 is similar to the fourth insulation layer 844 shown in FIG. 8, and includes one or more of the aspects, features, components, and/or properties thereof.

Figure 20:
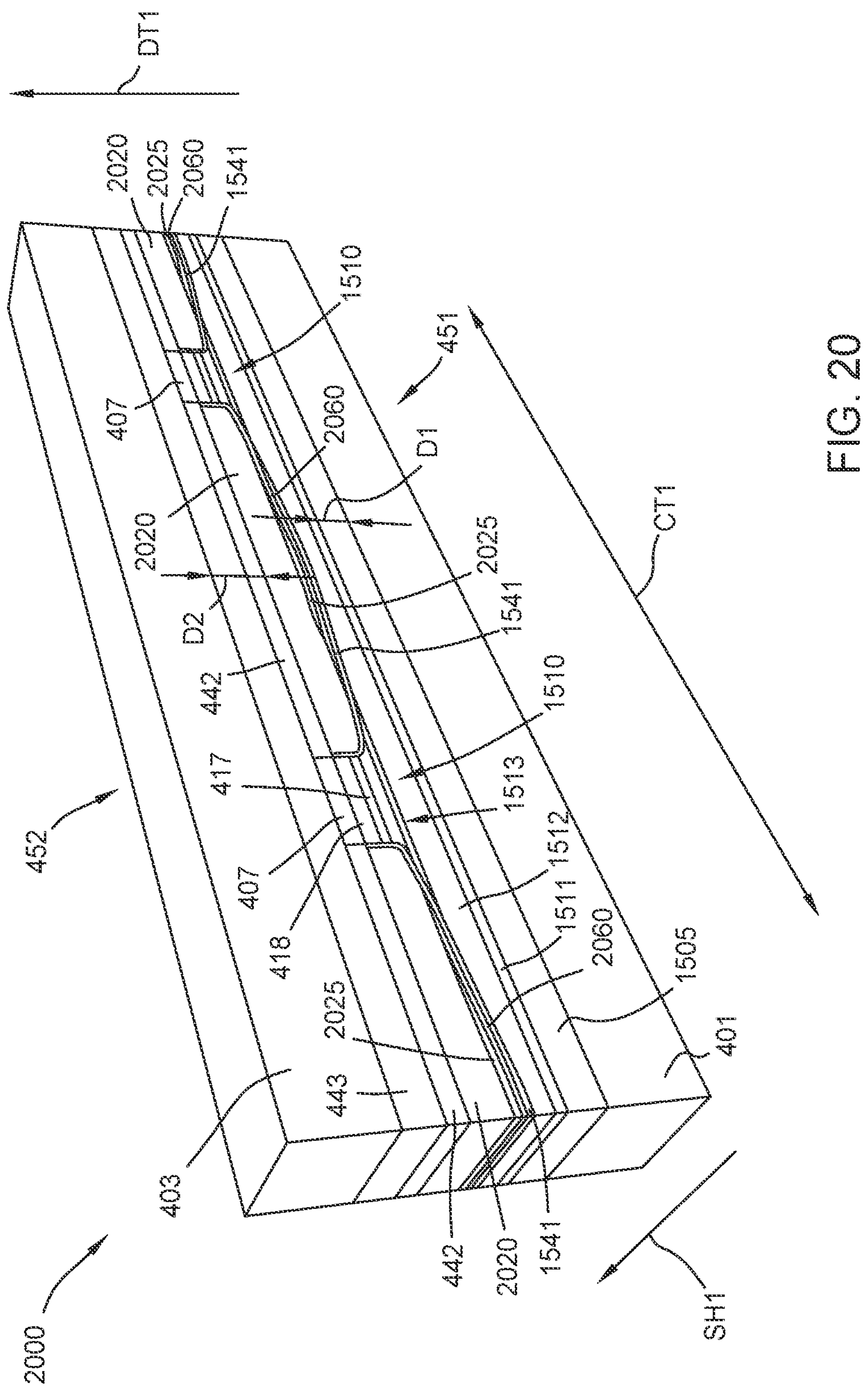
FIG. 20 is a schematic isometric media facing surface (MFS) view of a read head, according to one implementation.

FIG. 20 is a schematic isometric media facing surface (MFS) view of a read head 2000, according to one implementation. The read head 2000 is similar to the read head 1500 shown in FIG. 15, and includes one or more of the aspects, features, components, and/or properties thereof.

The read head 2000 includes a plurality of soft bias side shields 2020 disposed between and outwardly of the read sensors 1510. A plurality of buffer layers 2060 are disposed on the first insulation layers 1541. A second plurality of AFM layers 2025 are disposed between the buffer layers 2060 and the soft bias side shields 2020.

Figure 21:
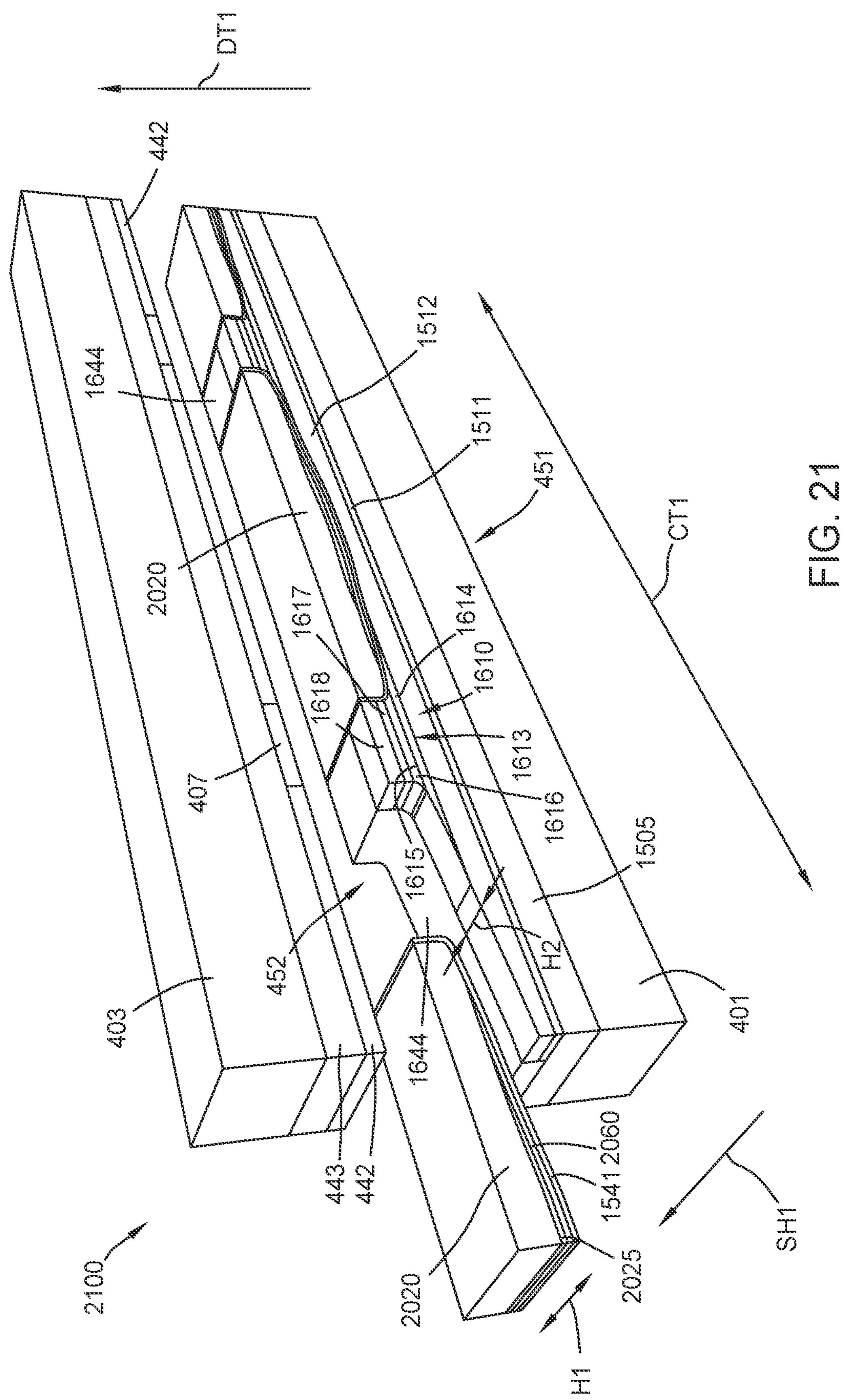
FIG. 21 is a schematic partially exploded isometric media facing surface (MFS) view of a read head, according to one implementation.

FIG. 21 is a schematic partially exploded isometric media facing surface (MFS) view of a read head 2100, according to one implementation. The read head 2100 is similar to the read head 1600 shown in FIG. 16, and includes one or more of the aspects, features, components, and/or properties thereof. The read head 2100 is similar to the read head 2000 shown in FIG. 20, and includes one or more of the aspects, features, components, and/or properties thereof. As an example, the read head 2100 combines the configurations of the soft bias side shields 2020, the second plurality of AFM layers 2025, and the buffer layers 2060 with the configurations of the read sensors 1610.

Figure 22:
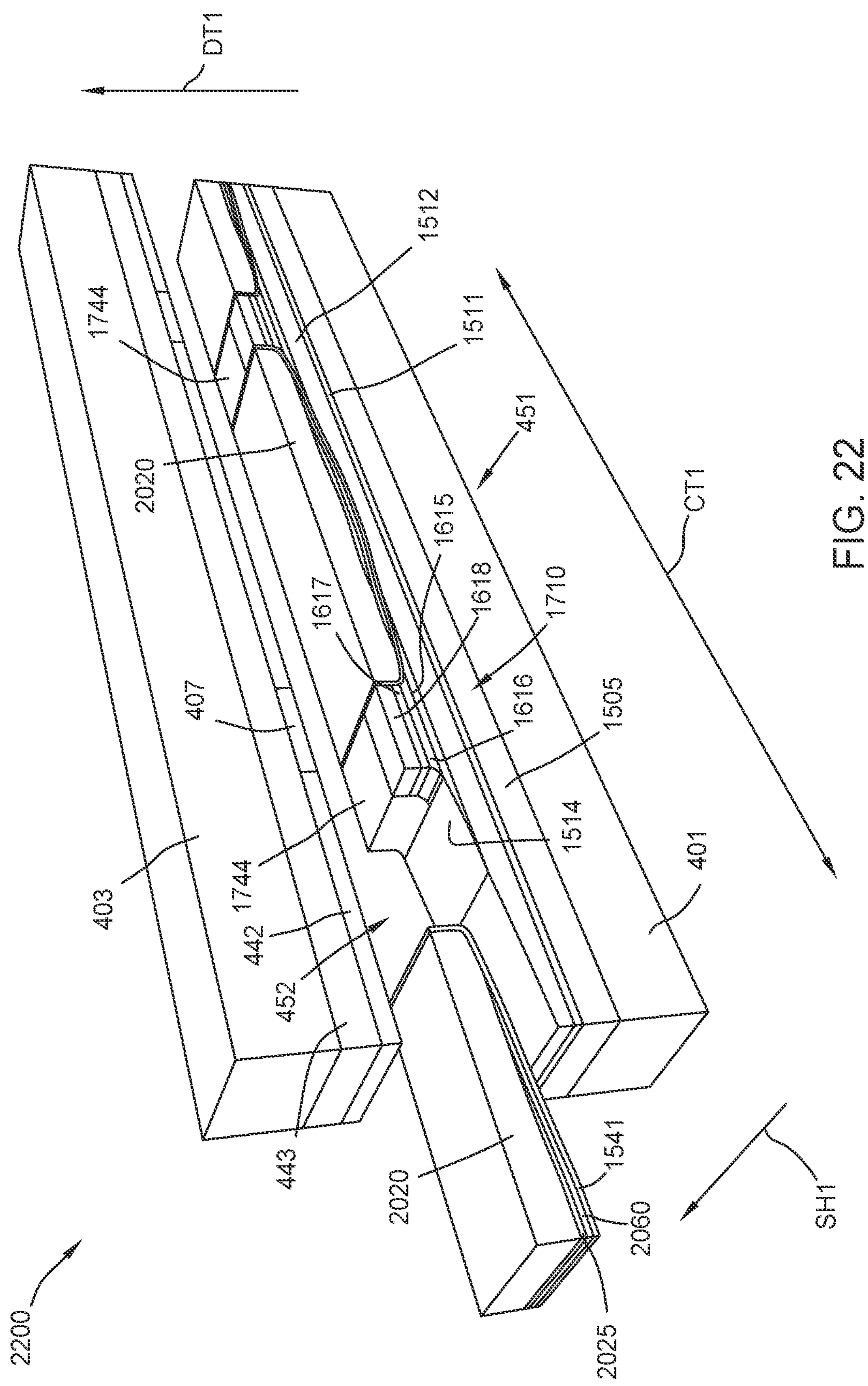
FIG. 22 is a schematic partially exploded isometric media facing surface (MFS) view of a read head, according to one implementation.

FIG. 22 is a schematic partially exploded isometric media facing surface (MFS) view of a read head 2200, according to one implementation. The read head 2200 is similar to the read head 1700 shown in FIG. 17, and includes one or more of the aspects, features, components, and/or properties thereof. The read head 2200 is similar to the read head 2000 shown in FIG. 20, and includes one or more of the aspects, features, components, and/or properties thereof. As an example, the read head 2200 combines the configurations of the soft bias side shields 2020, the second plurality of AFM layers 2025, and the buffer layers 2060 with the configurations of the read sensors 1710.

Figure 23:
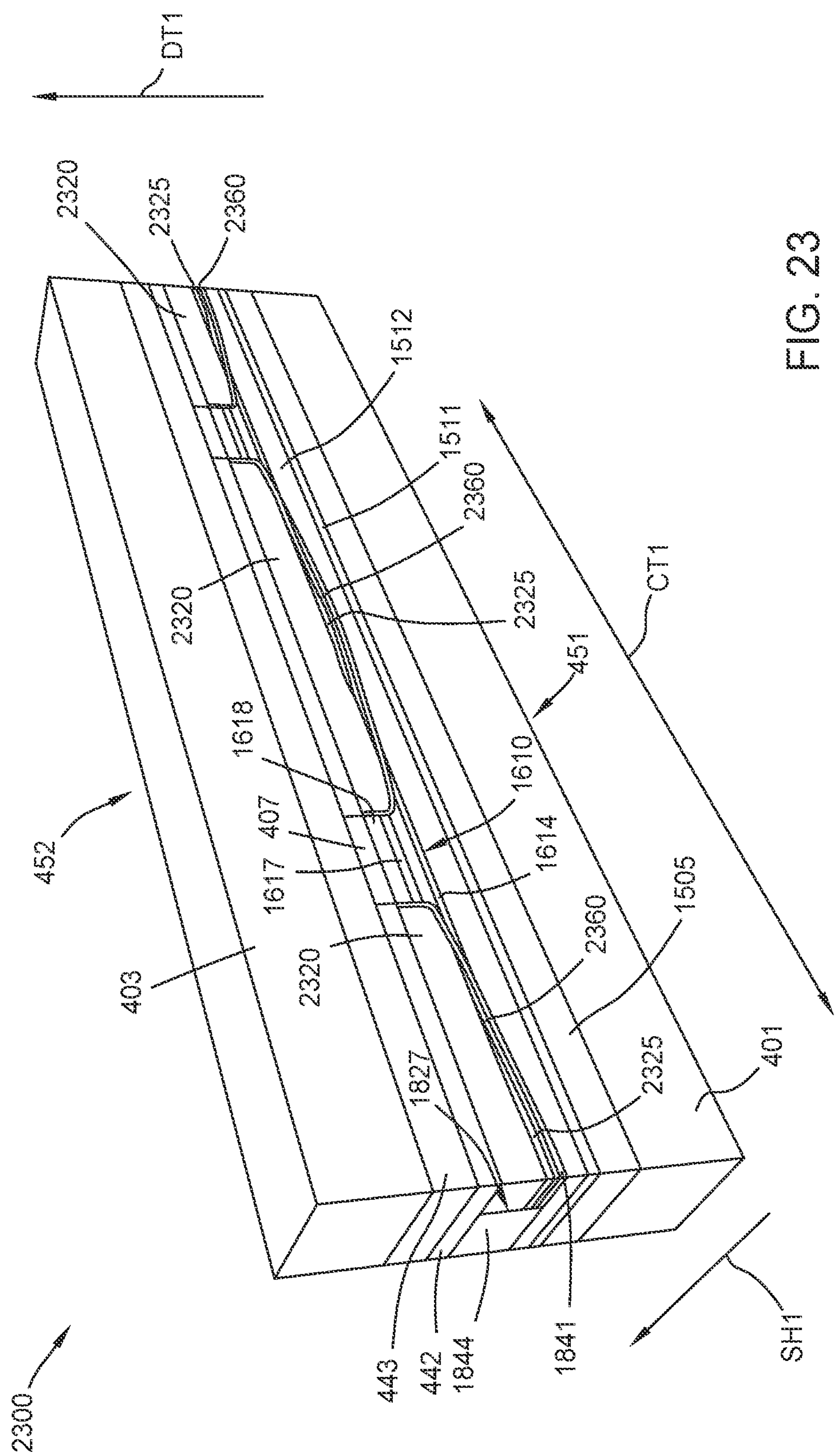
FIG. 23 is a schematic isometric media facing surface (MFS) view of a read head, according to one implementation.

FIG. 23 is a schematic isometric media facing surface (MFS) view of a read head 2300, according to one implementation. The read head 2300 is similar to the read head 1800 shown in FIG. 18, and includes one or more of the aspects, features, components, and/or properties thereof. The read head 2300 is similar to the read head 2000 shown in FIG. 20, and includes one or more of the aspects, features, components, and/or properties thereof. As an example, the read head 2300 combines the configurations of the first insulation layers 1841 and the fourth insulation layer 1844 with the configurations of the second insulation layers 442 and the third insulation layer 443.

In the implementation shown in FIG. 23, the fourth insulation layer 1844 is disposed behind (along the stripe height direction SH1) a plurality of buffer layers 2360, a plurality of second AFM layers 2325, and a plurality of soft bias side shields 2320. The buffer layers 2060, 2360 can be nonmagnetic and conductive.

Figure 24:
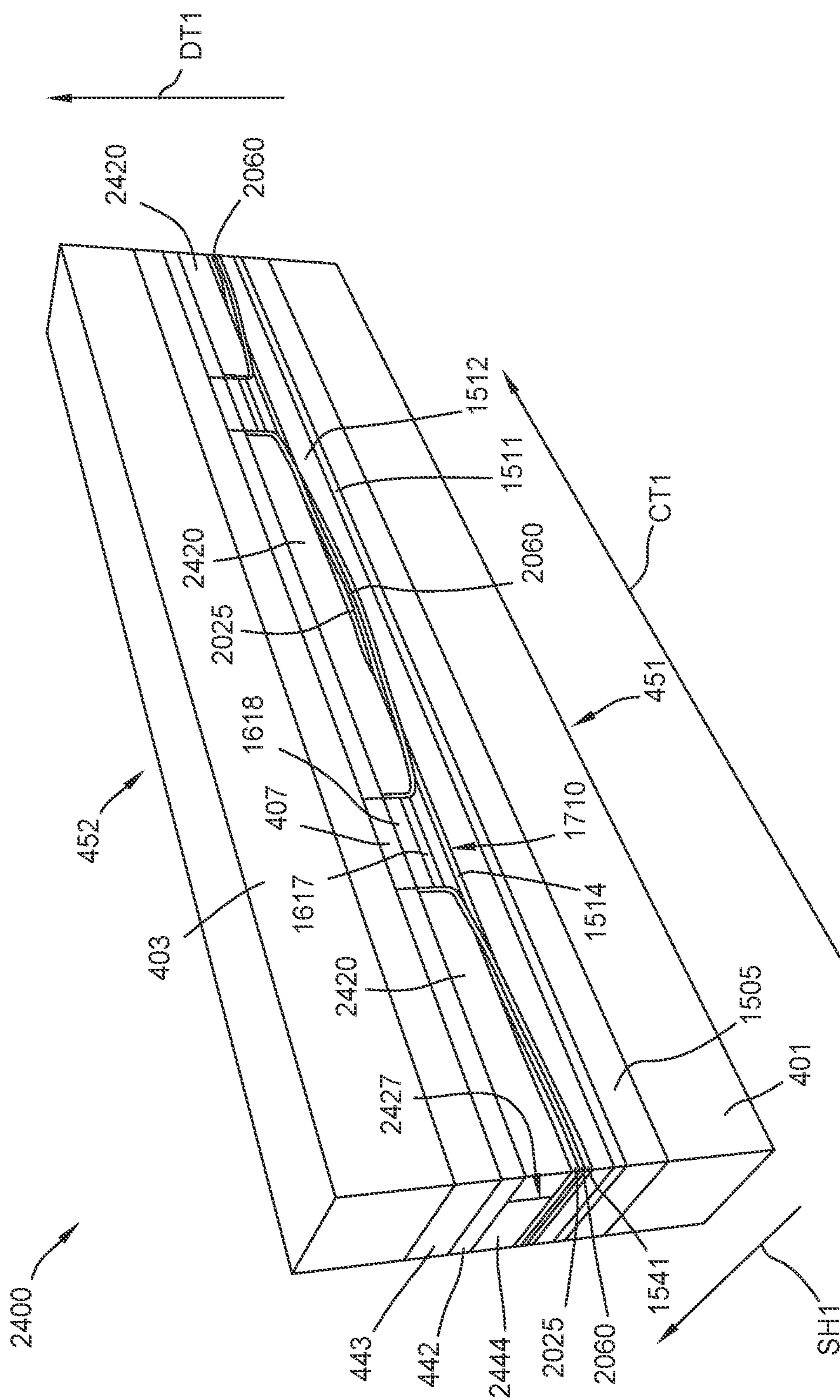
FIG. 24 is a schematic isometric media facing surface (MFS) view of a read head, according to one implementation.

FIG. 24 is a schematic isometric media facing surface (MFS) view of a read head 2400, according to one implementation. The read head 2400 is similar to the read head 2000 shown in FIG. 20, and includes one or more of the aspects, features, components, and/or properties thereof. The read head 2400 is similar to the read head 2200 shown in FIG. 22, and includes one or more of the aspects, features, components, and/or properties thereof. As an example, the read head 2400 combines the configurations of the second plurality of AFM layers 2025 and the buffer layers 2060 with the configurations of the read sensors 1710.

The read head 2400 includes a fourth insulation layer 2444. The fourth insulation layer 2444 is similar to the fourth insulation layer 1444 shown in FIG. 14, and includes one or more of the aspects, features, components, and/or properties thereof. The fourth insulation layer 2444 is formed behind a plurality of soft bias side shields 2420 and portions of the read sensors 1710 along the stripe height direction SH1. The fourth insulation layer 2444 is formed in a recess 2427.

FIGS. 25A-25F illustrate a schematic process flow of a method 2500 of forming at least a portion of a read head, according to one implementation. The method 2500 can be used, for example, to form at least a portion of the read head 400 shown in FIG. 4.

Figure 25A:
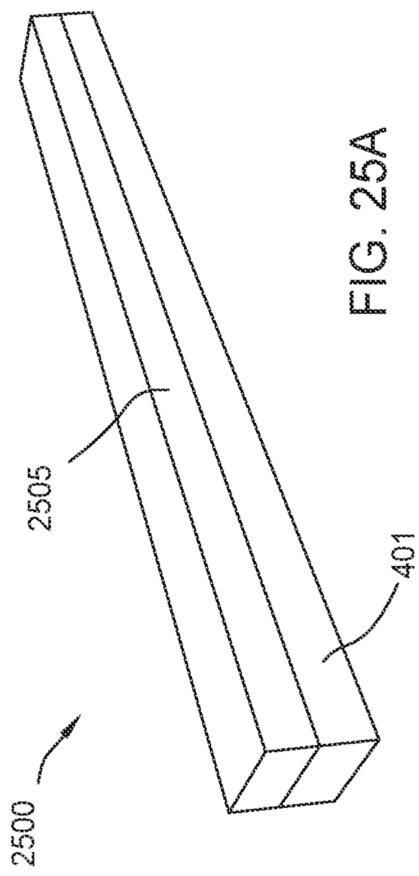
FIGS. 25A-25F illustrate a schematic process flow of a method of forming at least a portion of a read head, according to one implementation.

FIG. 25A shows forming of the lower shield 401 and a lower lead layer 2505 above the lower shield 401.

Figure 25B:
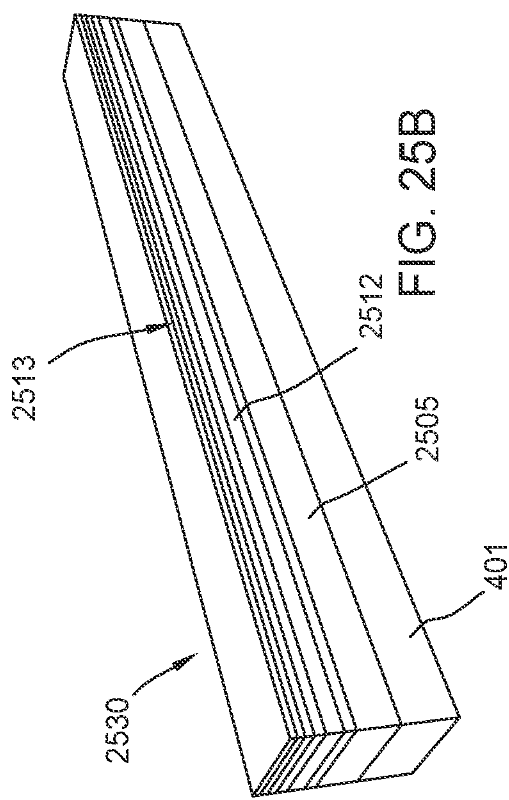

FIG. 25B shows forming of a multilayer structure 2530 above the lower lead layer 2505. The multilayer structure 2530 includes a first antiferromagnetic (AFM) layer 2512, and a free layer 2513.

Figure 25C:
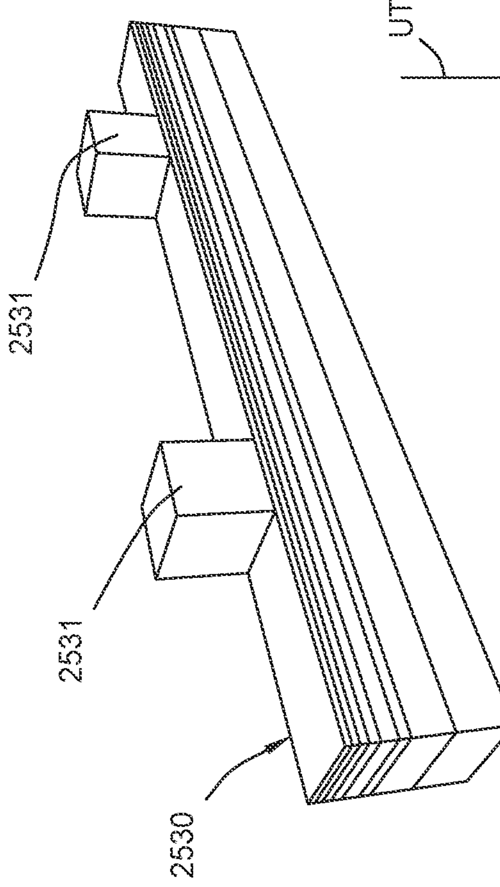

FIG. 25C shows forming of photoresist layers 2531 on the multilayer structure 2530.

Figure 25D:
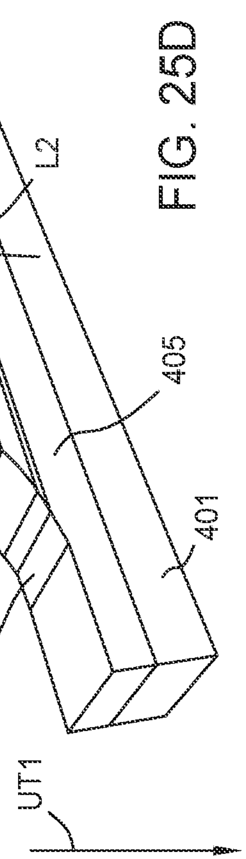

FIG. 25D shows removing (e.g, milling) of sections of the multilayer structure 2530 to form the plurality of read sensors 410. Portions of the lower lead layer 2505 are also removed in FIG. 25D to form the one or more lower leads 405. In FIG. 25D, at least a portion of each section of the multilayer structure 2530 is removed in the length L2 extending in an uptrack direction UT1 up to the plurality of lower leads 405 such that the first AFM layer 412 of each read sensor 410 is of the first width W1 along the crosstrack direction CT1 that is less than the second width W2 of each lower lead 405.

Figure 25F:
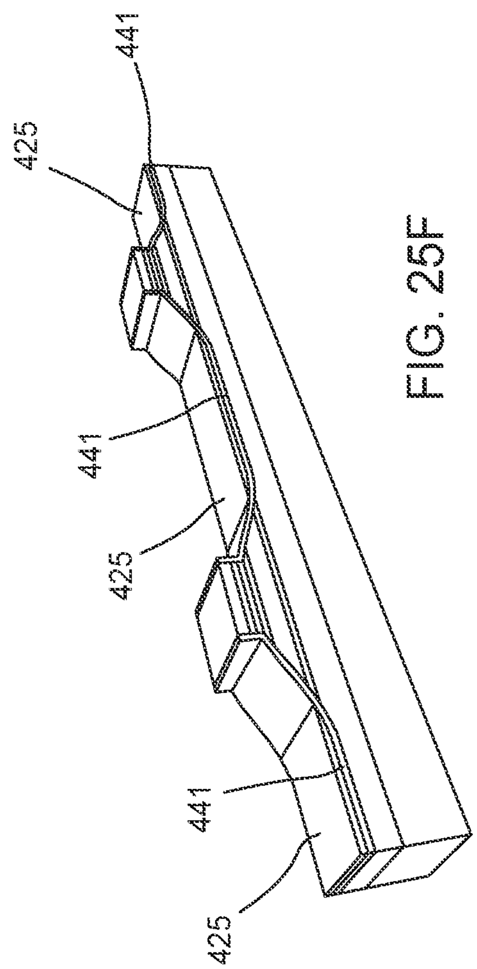
Figure 25E:
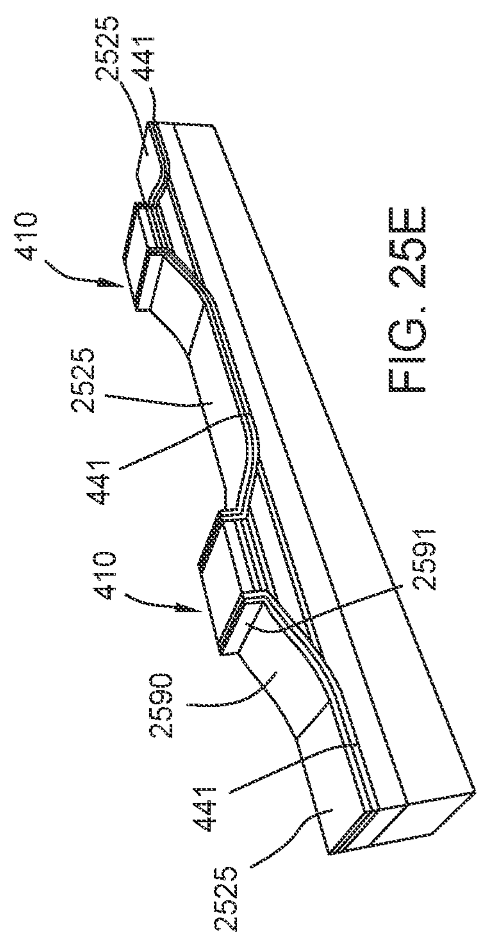

FIG. 25E shows forming the first insulation layers 441 and a plurality of second AFM layers 2525.

FIG. 25F shows removing (e.g., milling) angled sections 2590 and vertical sections 2591 of the second AFM layers 2525 to form the second AFM layers 425.

The upper leads 407, the second insulation layers 442, the third insulation layer 443, and the upper shield 403 can then be formed.

Benefits of the present disclosure include using soft bias side shields in tape drives to facilitate low coercivity, enhanced magnetic reading operations (such as higher reading density), stability of the soft bias elements, reduced signal shunting, and enhanced device performance.

It is contemplated that one or more aspects disclosed herein may be combined. As an example, the present disclosure contemplates that aspects of the storage device 100, the read head 400, the read head 500, the read head 600, the read head 700, the read head 800, the read head 1000, the read head 1100, the read head 1200, the read head 1300, the read head 1400, the read head 1500, the read head 1600, the read head 1700, the read head 1800, the read head 1900, the read head 2000, the read head 2100, the read head 2200, the read head 2300, the read head 2400, and/or the method 2500 may be combined. Moreover, it is contemplated that one or more aspects disclosed herein may include some or all of the aforementioned benefits.

Two read sensors are shown for the read heads in each of the Figures for exemplary purposes. The present disclosure contemplates that the read heads can include additional read sensors. For example, the read heads can each include sixteen read sensors. The implementation shown in FIG. 4, the read head 400 is shown as having two read sensors 410 as an example. The present disclosure contemplates that the read head 400 can include additional read sensors 410. For example the read head 400 can include sixteen read sensors 410 in the configuration shown in FIG. 4.

In one implementation, a read head for magnetic storage devices includes a lower shield, an upper shield, and one or more lower leads disposed between the lower shield and the upper shield. The read head includes a plurality of upper leads disposed above the one or more lower leads along a downtrack direction. Each of the plurality of upper leads and each of the one or more lower leads is nonmagnetic and conductive. The read head includes a plurality of read sensors disposed between the one or more lower leads and the plurality of upper leads. Each read sensor of the plurality of read sensors includes a multilayer structure, and the multilayer structure includes a first antiferromagnetic (AFM) layer, and a free layer. The read head includes a plurality of soft bias side shields disposed between and outwardly of the plurality of read sensors, and a plurality of second AFM layers disposed between the lower shield and the plurality of soft bias side shields. The plurality of second AFM layers are formed of iridium manganese (IrMn). The plurality of second AFM layers are disposed between the plurality of soft bias side shields and the one or more lower leads. A buffer layer of each read sensor is disposed at a first distance relative to the lower shield, and a cap layer of each read sensor is disposed at a second distance relative to the upper shield that is substantially equal to the first distance. In one example, the first AFM layer of each read sensor is a part of a common AFM layer spanning the plurality of read sensors, the one or more lower leads include a common lower lead spanning the plurality of read sensors, and the buffer layer of each read sensor is a part of a common buffer layer spanning the plurality of read sensors. In one example, the read head includes a plurality of first insulation layers disposed between the second AFM layers and the common lower lead. In one example, the common AF layer is of a first width along a crosstrack direction, and the common lower lead is of a second width that is substantially equal to the first width. Vertical sections and angled sections of the plurality of first insulation layers contact the plurality of soft bias side shields. In one example, the read head includes a plurality of first insulation layers disposed between the plurality of second AFM layers and the one or more lower leads, and the plurality of first insulation layers are disposed between the first AFM layers of the read sensors and the plurality of soft bias side shields. In one example, the first AFM layer of each read sensor is of a first width along a crosstrack direction, and each lower lead of the one or more lower leads is of a second width that is greater than the first width. A magnetic storage device including the read head is also disclosed.

In one implementation, a read head for magnetic storage devices includes a lower shield, an upper shield, and one or more lower leads disposed between the lower shield and the upper shield. The read head includes a plurality of upper leads disposed above the one or more lower leads along a downtrack direction. Each of the one or more lower leads and each of the plurality of upper leads is conductive. The read head includes a plurality of read sensors disposed between the one or more lower leads and the plurality of upper leads. Each read sensor of the plurality of read sensors includes a multilayer structure, and the multilayer structure includes a first antiferromagnetic (AFM) layer, and a free layer. The read head includes a plurality of soft bias side shields disposed among the plurality of read sensors, and a plurality of second AFM layers disposed between the one or more lower leads and the plurality of soft bias side shields. The multilayer structure includes a buffer layer disposed between the first AFM layer and the one or more lower leads. In one example, the first AFM layer of each read sensor is a part of a common AFM layer spanning the plurality of read sensors, the buffer layer of each read sensor is a part of a common buffer layer spanning the plurality of read sensors, and the one or more lower leads include a common lower lead spanning the plurality of read sensors. In one example, each of the plurality of second AFM layers is formed on a buffer layer of a plurality of buffer layers disposed between the plurality of second AFM layers and a plurality of first insulation layers, and the plurality of first insulation layers are disposed between the plurality of buffer layers and the common lower lead. In one example, each of the plurality of second AFM layers is formed on a buffer layer of a plurality of buffer layers disposed between the plurality of second AFM layers and a plurality of first insulation layers, and the plurality of first insulation layers are disposed between the plurality of buffer layers and the one or more lower leads. The plurality of first insulation layers are disposed between the first AFM layers of the plurality of read sensors and the plurality of buffer layers. The read head includes a plurality of second insulation layers disposed between and outwardly of the plurality of upper leads, and a third insulation layer disposed between the plurality of upper leads and the upper shield. A magnetic storage device including the read head is also disclosed.

In one implementation, a method of forming a read head for magnetic storage devices includes forming a lower shield, forming a lower lead layer above the lower shield, and forming a multilayer structure above the lower lead layer, the multilayer structure includes a first antiferromagnetic (AFM) layer, and a free layer. The method includes removing sections of the multilayer structure to form a plurality of read sensors, forming a plurality of first insulation layers between and outwardly of the plurality of read sensors, and forming a plurality of second AFM layers above the plurality of first insulation layers. The method includes forming a plurality of soft bias side shields above the plurality of second AFM layers, and forming one or more upper leads. The lower lead layer and each of the one or more upper leads is nonmagnetic and conductive. The method includes forming an upper shield. The one or more upper leads include a plurality of upper leads. The method includes forming a plurality of second insulation layers between and outwardly of the plurality of upper leads, and forming a third insulation layer above the plurality of upper leads and the plurality of second insulation layers. In one example, the removing sections of the multilayer structure to form the plurality of read sensors includes removing at least a portion of each section of the multilayer structure in a length extending in an uptrack direction up to the lower lead layer such that the first AFM layer of each read sensor is of a first width along a crosstrack direction that is less than a second width of the lower lead layer.

While the foregoing is directed to embodiments of the present disclosure, other and further embodiments of the disclosure may be devised without departing from the basic scope thereof, and the scope thereof is determined by the claims that follow.

What is claimed is:

1. A read head for magnetic storage devices, comprising:
- a lower shield;
- an upper shield;
- one or more lower leads disposed between the lower shield and the upper shield;
- a plurality of upper leads disposed above the one or more lower leads along a downtrack direction, wherein each of the one or more lower leads and each of the plurality of upper leads is conductive;
- a plurality of read sensors disposed between the one or more lower leads and the plurality of upper leads, each read sensor of the plurality of read sensors comprising a multilayer structure, the multilayer structure comprising:
  - a first antiferromagnetic (AFM) layer,
  - a free layer, and
  - a buffer layer disposed between the first AFM layer and the one or more lower leads;
- a plurality of soft bias side shields disposed among the plurality of read sensors; and
- a plurality of second AFM layers disposed between the one or more lower leads and the plurality of soft bias side shields.

2. The read head of claim 1, wherein:
- the first AFM layer of each read sensor is a part of a common AFM layer spanning the plurality of read sensors;
- the buffer layer of each read sensor is a part of a common buffer layer spanning the plurality of read sensors; and
- the one or more lower leads include a common lower lead spanning the plurality of read sensors.

3. The read head of claim 2, wherein each of the plurality of second AFM layers is formed on a buffer layer of a plurality of buffer layers disposed between the plurality of second AFM layers and a plurality of first insulation layers, wherein the plurality of first insulation layers are disposed between the plurality of buffer layers and the common lower lead.

4. The read head of claim 1, wherein each of the plurality of second AFM layers is formed on a buffer layer of a plurality of buffer layers disposed between the plurality of second AFM layers and a plurality of first insulation layers, wherein the plurality of first insulation layers are disposed between the plurality of buffer layers and the one or more lower leads, and the plurality of first insulation layers are disposed between the first AFM layers of the read sensors and the plurality of buffer layers.

5. The read head of claim 4, further comprising:
- a plurality of second insulation layers disposed between and outwardly of the plurality of upper leads; and
- a third insulation layer disposed between the plurality of upper leads and the upper shield.

6. A magnetic storage device comprising the read head of claim 1.

7. A read head for magnetic storage devices, comprising:
- a lower shield;
- an upper shield;
- one or more lower leads disposed between the lower shield and the upper shield;
- a plurality of upper leads disposed above the one or more lower leads along a downtrack direction, wherein each of the plurality of upper leads and each of the one or more lower leads is nonmagnetic and conductive;
- a plurality of read sensors disposed between the one or more lower leads and the plurality of upper leads, wherein a buffer layer of each read sensor is disposed at a first distance relative to the lower shield, a cap layer of each read sensor is disposed at a second distance relative to the upper shield that is substantially equal to the first distance, and each read sensor of the plurality of read sensors comprises a multilayer structure, the multilayer structure comprising:
  - a first antiferromagnetic (AFM) layer, and
  - a free layer;
- a plurality of soft bias side shields disposed between and outwardly of the plurality of read sensors; and
- a plurality of second AFM layers disposed between the lower shield and the plurality of soft bias side shields.

8. The read head of claim 7, wherein the plurality of second AFM layers are formed of iridium manganese (IrMn).

9. The read head of claim 8, wherein the plurality of second AFM layers are disposed between the plurality of soft bias side shields and the one or more lower leads.

10. The read head of claim 9, wherein:

the first AFM layer of each read sensor is a part of a common AFM layer spanning the plurality of read sensors;

the one or more lower leads include a common lower lead spanning the plurality of read sensors; and the buffer layer of each read sensor is a part of a common buffer layer spanning the plurality of read sensors.

11. The read head of claim 10, further comprising a plurality of first insulation layers disposed between the second AFM layers and the common lower lead.

12. The read head of claim 11, wherein the common AF layer is of a first width along a crosstrack direction, and the common lower lead is of a second width that is substantially equal to the first width.

13. The read head of claim 11, wherein vertical sections and angled sections of the plurality of first insulation layers contact the plurality of soft bias side shields.

14. The read head of claim 7, further comprising a plurality of first insulation layers disposed between the plurality of second AFM layers and the one or more lower leads, wherein the plurality of first insulation layers are disposed between the first AFM layers of the plurality of read sensors and the plurality of soft bias side shields.

15. The read head of claim 14, wherein the first AFM layer of each read sensor is of a first width along a crosstrack direction, and each lower lead of the one or more lower leads is of a second width that is greater than the first width.

16. A magnetic storage device comprising the read head of claim 1.

17. A method of forming a read head for magnetic storage devices, comprising:

forming a lower shield;

forming one or more lower leads above the lower shield;

forming a multilayer structure above the one or more lower leads, the multilayer structure comprising:

a first antiferromagnetic (AFM) layer, a free layer, and a buffer layer disposed between the first AFM layer and the one or more lower leads;

removing sections of the multilayer structure to form a plurality of read sensors that each comprise the multilayer structure;

forming a plurality of first insulation layers between and outwardly of the plurality of read sensors;

forming a plurality of second AFM layers above the plurality of first insulation layers;

forming a plurality of soft bias side shields among the plurality of read sensors and above the plurality of second AFM layers, wherein the plurality of second AFM layers are disposed between the one or more lower leads and the plurality of soft bias side shields;

forming a plurality of upper leads above the one or more lower leads along a downtrack direction, wherein each of the one or more lower leads and each of the plurality of upper leads is conductive, wherein the plurality of read sensors are disposed between the one or more lower leads and the plurality of upper leads; and forming an upper shield, wherein the one or more lower leads are disposed between the lower shield and the upper shield.

18. The method of claim 17, wherein the method further comprises:

forming a plurality of second insulation layers between and outwardly of the plurality of upper leads;

forming a third insulation layer above the plurality of upper leads and the plurality of second insulation layers; and wherein the removing sections of the multilayer structure to form the plurality of read sensors comprises removing at least a portion of each section of the multilayer structure in a length extending in an uptrack direction up to the one or more lower leads such that the first AFM layer of each read sensor is of a first width along a crosstrack direction that is less than a second width of the one or more lower leads.

* * * * *